United States Patent
Palmer et al.

(10) Patent No.: US 10,930,093 B2
(45) Date of Patent: *Feb. 23, 2021

(54) VEHICLE EVENT RECORDING SYSTEM AND METHOD

(71) Applicant: SmartDrive Systems, Inc., San Diego, CA (US)

(72) Inventors: Jason Palmer, Carlsbad, CA (US); Slaven Sljivar, San Diego, CA (US); Daniel A. Deninger, Carlsbad, CA (US); Alekh Vaidya, San Diego, CA (US); Jeffrey Griswold, San Diego, CA (US); Mark Freitas, San Diego, CA (US)

(73) Assignee: SmartDrive Systems, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/426,386

(22) Filed: May 30, 2019

(65) Prior Publication Data

US 2019/0279441 A1    Sep. 12, 2019

Related U.S. Application Data

(63) Continuation of application No. 15/620,420, filed on Jun. 12, 2017, which is a continuation of application
(Continued)

(51) Int. Cl.
*G07C 5/08* (2006.01)
*H04N 7/18* (2006.01)
(Continued)

(52) U.S. Cl.
CPC .............. *G07C 5/08* (2013.01); *B60R 16/023* (2013.01); *G07C 5/008* (2013.01); *G07C 5/0866* (2013.01); *H04N 7/18* (2013.01); *H04N 7/183* (2013.01)

(58) Field of Classification Search
USPC ....................................................... 701/29.1
See application file for complete search history.

(56) References Cited

U.S. PATENT DOCUMENTS 2,943,141 A    6/1960    Knight
3,634,866 A    1/1972    Meyer
(Continued)

FOREIGN PATENT DOCUMENTS

CA    2469728    12/2005
CA    2469728 A1    12/2005
(Continued)

OTHER PUBLICATIONS

"DriveCam Driving Feedback System" DriveCam brochure, Mar. 15, 2004, 4 pages.
(Continued)

*Primary Examiner* — Jean Paul Cass
(74) *Attorney, Agent, or Firm* — Esplin & Associates, PC

(57) ABSTRACT

This disclosure relates to a system configured to generate synchronized electronic vehicle event records. The synchronized vehicle event records may include vehicle operation information, video information, and/or other information. The synchronized electronic vehicle event records may be generated remotely (e.g., "in the cloud") from a vehicle. The system is configured to communicate with factory installed and/or other (e.g., third party) vehicle systems to generate the vehicle event information and/or cause other information relevant to a particular vehicle event to be transmitted in addition to the vehicle event information. By communicating with existing vehicle systems and causing these systems to transmit information related to vehicle events themselves, and generating the synchronized electronic vehicle event records remotely from a vehicle the system reduces the
(Continued)

amount and/or cost of aftermarket equipment that must be installed in a vehicle for vehicle event monitoring.

16 Claims, 5 Drawing Sheets

Related U.S. Application Data

No. 14/676,622, filed on Apr. 1, 2015, now Pat. No. 9,679,420.

(51) Int. Cl.
*G07C 5/00* (2006.01)
*B60R 16/023* (2006.01)

(56) References Cited

U.S. PATENT DOCUMENTS

| | | |
|---|---|---|
| 3,781,824 A | 12/1973 | Caiati |
| 3,812,287 A | 5/1974 | Lemelson |
| 3,885,090 A | 5/1975 | Rosenbaum |
| 3,992,656 A | 11/1976 | Joy |
| 4,054,752 A | 10/1977 | Dennis, Jr. |
| 4,072,850 A | 2/1978 | McGlynn |
| 4,258,421 A | 3/1981 | Juhasz |
| 4,271,358 A | 6/1981 | Schwarz |
| 4,276,609 A | 6/1981 | Patel |
| 4,280,151 A | 7/1981 | Tsunekawa |
| 4,281,354 A | 7/1981 | Conte |
| 4,401,976 A | 8/1983 | Stadelmayr |
| 4,409,670 A | 10/1983 | Herndon |
| 4,420,773 A | 12/1983 | Toyoda |
| 4,425,097 A | 1/1984 | Owens |
| 4,456,931 A | 6/1984 | Toyoda |
| 4,489,351 A | 12/1984 | dAlayer de Costemore dArc |
| 4,496,995 A | 1/1985 | Colles |
| 4,500,868 A | 2/1985 | Tokitsu |
| 4,528,547 A | 7/1985 | Rodney |
| 4,533,962 A | 8/1985 | Decker |
| 4,558,379 A | 12/1985 | Hutter |
| 4,588,267 A | 5/1986 | Pastore |
| 4,593,313 A | 6/1986 | Nagasaki |
| 4,621,335 A | 11/1986 | Bluish |
| 4,625,210 A | 11/1986 | Sagl |
| 4,630,110 A | 12/1986 | Cotton |
| 4,632,348 A | 12/1986 | Keesling |
| 4,638,289 A | 1/1987 | Zottnik |
| 4,646,241 A | 2/1987 | Ratchford |
| 4,651,143 A | 3/1987 | Yamanaka |
| 4,671,111 A | 6/1987 | Lemelson |
| 4,718,685 A | 1/1988 | Kawabe |
| 4,754,255 A | 6/1988 | Sanders |
| 4,758,888 A | 7/1988 | Lapidot |
| 4,763,745 A | 8/1988 | Eto |
| 4,785,474 A | 11/1988 | Bernstein |
| 4,789,904 A | 12/1988 | Peterson |
| 4,794,566 A | 12/1988 | Richards |
| 4,804,937 A | 2/1989 | Barbiaux |
| 4,806,931 A | 2/1989 | Nelson |
| 4,807,096 A | 2/1989 | Skogler |
| 4,814,896 A | 3/1989 | Heitzman |
| 4,837,628 A | 6/1989 | Sasaki |
| 4,839,631 A | 6/1989 | Tsuji |
| 4,843,463 A | 6/1989 | Michetti |
| 4,843,578 A | 6/1989 | Wade |
| 4,853,856 A | 8/1989 | Hanway |
| 4,853,859 A | 8/1989 | Morita |
| 4,866,616 A | 9/1989 | Takeuchi |
| 4,876,597 A | 10/1989 | Roy |
| 4,883,349 A | 11/1989 | Mittelhauser |
| 4,896,855 A | 1/1990 | Furnish |
| 4,926,331 A | 5/1990 | Windle |
| 4,930,742 A | 6/1990 | Schofield |
| 4,936,533 A | 6/1990 | Adams |
| 4,939,652 A | 7/1990 | Steiner |
| 4,942,464 A | 7/1990 | Milatz |
| 4,945,244 A | 7/1990 | Castleman |
| 4,949,186 A | 8/1990 | Peterson |
| 4,980,913 A | 12/1990 | Skret |
| 4,987,541 A | 1/1991 | Levente |
| 4,992,943 A | 2/1991 | McCracken |
| 4,993,068 A | 2/1991 | Piosenka |
| 4,995,086 A | 2/1991 | Lilley |
| 5,012,335 A | 4/1991 | Cohodar |
| 5,027,104 A | 6/1991 | Reid |
| 5,046,007 A | 9/1991 | McCrery |
| 5,050,166 A | 9/1991 | Cantoni |
| 5,056,056 A | 10/1991 | Gustin |
| 5,057,820 A | 10/1991 | Markson |
| 5,096,287 A | 3/1992 | Kakinami |
| 5,100,095 A | 3/1992 | Haan |
| 5,111,289 A | 5/1992 | Lucas |
| 5,140,434 A | 8/1992 | Van Blessinger |
| 5,140,436 A | 8/1992 | Blessinger |
| 5,140,438 A | 8/1992 | Kurahashi |
| 5,144,661 A | 9/1992 | Shamosh |
| 5,178,448 A | 1/1993 | Adams |
| 5,185,700 A | 2/1993 | Bezos |
| 5,196,938 A | 3/1993 | Blessinger |
| 5,223,844 A | 6/1993 | Mansell |
| 5,224,211 A | 6/1993 | Roe |
| 5,262,813 A | 11/1993 | Scharton |
| 5,283,433 A | 2/1994 | Tsien |
| 5,294,978 A | 3/1994 | Katayama |
| 5,305,214 A | 4/1994 | Komatsu |
| 5,305,216 A | 4/1994 | Okura |
| 5,308,247 A | 5/1994 | Dyrdek |
| 5,309,485 A | 5/1994 | Chao |
| 5,311,197 A | 5/1994 | Sorden |
| 5,321,753 A | 6/1994 | Gritton |
| 5,327,288 A | 7/1994 | Wellington |
| 5,330,149 A | 7/1994 | Haan |
| 5,333,759 A | 8/1994 | Deering |
| 5,343,527 A | 8/1994 | Moore |
| 5,353,023 A | 10/1994 | Mitsugi |
| 5,361,326 A | 11/1994 | Aparicio, IV |
| 5,387,926 A | 2/1995 | Bellan |
| 5,388,045 A | 2/1995 | Kamiya |
| 5,388,208 A | 2/1995 | Weingartner |
| 5,404,330 A | 4/1995 | Lee |
| 5,408,330 A | 4/1995 | Squicciarini |
| 5,422,543 A | 6/1995 | Weinberg |
| 5,430,431 A | 7/1995 | Nelson |
| 5,430,432 A | 7/1995 | Camhi |
| 5,435,184 A | 7/1995 | Pineroli |
| 5,445,024 A | 8/1995 | Riley |
| 5,445,027 A | 8/1995 | Zorner |
| 5,446,659 A | 8/1995 | Yamawaki |
| 5,455,625 A | 10/1995 | Englander |
| 5,455,716 A | 10/1995 | Suman |
| 5,465,079 A | 11/1995 | Bouchard |
| 5,473,729 A | 12/1995 | Bryant |
| 5,477,141 A | 12/1995 | Nather |
| 5,495,242 A | 2/1996 | Kick |
| 5,495,243 A | 2/1996 | McKenna |
| 5,497,419 A | 3/1996 | Hill |
| 5,499,182 A | 3/1996 | Ousborne |
| 5,504,482 A | 4/1996 | Schreder |
| 5,505,076 A | 4/1996 | Parkman |
| 5,513,011 A | 4/1996 | Matsumoto |
| 5,515,285 A | 5/1996 | Garrett |
| 5,519,260 A | 5/1996 | Washington |
| 5,521,633 A | 5/1996 | Nakajima |
| 5,523,811 A | 6/1996 | Wada |
| 5,526,269 A | 6/1996 | Ishibashi |
| 5,530,420 A | 6/1996 | Tsuchiya |
| 5,532,678 A | 7/1996 | Kin |
| 5,537,156 A | 7/1996 | Katayama |
| 5,539,454 A | 7/1996 | Williams |
| 5,541,590 A | 7/1996 | Nishio |
| 5,544,060 A | 8/1996 | Fujii |
| 5,546,191 A | 8/1996 | Hibi |
| 5,546,305 A | 8/1996 | Kondo |
| 5,548,273 A | 8/1996 | Nicol |

(56) References Cited

U.S. PATENT DOCUMENTS

| | | | |
|---|---|---|---|
| 5,552,990 A | 9/1996 | Ihara | |
| 5,559,496 A | 9/1996 | Dubats | |
| 5,568,211 A | 10/1996 | Bamford | |
| 5,570,087 A | 10/1996 | Lemelson | |
| 5,570,127 A | 10/1996 | Schmidt | |
| 5,574,424 A | 11/1996 | Nguyen | |
| 5,574,443 A | 11/1996 | Hsieh | |
| D376,571 S | 12/1996 | Kokat | |
| 5,581,464 A | 12/1996 | Woll | |
| 5,586,130 A | 12/1996 | Doyle | |
| 5,590,948 A | 1/1997 | Moreno | |
| 5,596,382 A | 1/1997 | Bamford | |
| 5,596,647 A * | 1/1997 | Wakai | H04H 20/62 |
| | | | 348/E7.049 |
| 5,600,775 A | 2/1997 | King | |
| 5,608,272 A | 3/1997 | Tanguay | |
| 5,610,580 A | 3/1997 | Lai | |
| 5,612,686 A | 3/1997 | Takano | |
| 5,631,638 A | 5/1997 | Kaspar | |
| 5,638,273 A | 6/1997 | Coiner | |
| 5,642,106 A | 6/1997 | Hancock | |
| 5,646,856 A | 7/1997 | Kaesser | |
| 5,652,706 A | 7/1997 | Morimoto | |
| RE35,590 E | 8/1997 | Bezos | |
| 5,654,892 A | 8/1997 | Fujii | |
| 5,659,355 A | 8/1997 | Barron | |
| 5,666,120 A | 9/1997 | Kline | |
| 5,667,176 A | 9/1997 | Zamarripa | |
| 5,669,698 A | 9/1997 | Veldman | |
| 5,671,451 A | 9/1997 | Takahashi | |
| 5,677,979 A | 10/1997 | Squicciarini | |
| 5,680,117 A | 10/1997 | Arai | |
| 5,680,123 A | 10/1997 | Lee | |
| 5,686,765 A | 11/1997 | Washington | |
| 5,686,889 A | 11/1997 | Hillis | |
| 5,689,442 A | 11/1997 | Swanson | |
| 5,696,705 A | 12/1997 | Zykan | |
| 5,706,362 A | 1/1998 | Yabe | |
| 5,706,909 A | 1/1998 | Bevins | |
| 5,712,679 A | 1/1998 | Coles | |
| 5,717,456 A | 2/1998 | Rudt | |
| 5,719,554 A | 2/1998 | Gagnon | |
| 5,758,299 A | 5/1998 | Sandborg | |
| 5,781,101 A | 7/1998 | Stephen | |
| 5,781,145 A | 7/1998 | Williams | |
| 5,784,007 A | 7/1998 | Pepper | |
| 5,784,021 A | 7/1998 | Oliva | |
| 5,784,521 A | 7/1998 | Nakatani | |
| 5,790,403 A | 8/1998 | Nakayama | |
| 5,790,973 A | 8/1998 | Blaker | |
| 5,793,308 A | 8/1998 | Rosinski | |
| 5,793,420 A | 8/1998 | Schmidt | |
| 5,793,739 A | 8/1998 | Tanaka | |
| 5,793,985 A | 8/1998 | Natarajan | |
| 5,794,165 A | 8/1998 | Minowa | |
| 5,797,134 A | 8/1998 | McMillan | |
| 5,798,458 A | 8/1998 | Monroe | |
| 5,800,040 A | 9/1998 | Santo | |
| 5,802,545 A | 9/1998 | Coverdill | |
| 5,802,727 A | 9/1998 | Blank | |
| 5,805,079 A | 9/1998 | Lemelson | |
| 5,813,745 A | 9/1998 | Fant, Jr. | |
| 5,815,071 A | 9/1998 | Doyle | |
| 5,815,093 A | 9/1998 | Kikinis | |
| 5,819,198 A | 10/1998 | Peretz | |
| 5,825,284 A | 10/1998 | Dunwoody | |
| 5,825,412 A | 10/1998 | Hobson | |
| 5,844,505 A | 12/1998 | Van Ryzin | |
| 5,845,733 A | 12/1998 | Wolfsen | |
| 5,867,802 A | 2/1999 | Borza | |
| 5,877,897 A | 3/1999 | Schofield | |
| 5,896,167 A | 4/1999 | Omae | |
| 5,897,602 A | 4/1999 | Mizuta | |
| 5,897,606 A | 4/1999 | Miura | |
| 5,899,956 A | 5/1999 | Chan | |
| 5,901,806 A | 5/1999 | Takahashi | |
| 5,914,748 A | 6/1999 | Parulski | |
| 5,919,239 A | 7/1999 | Fraker | |
| 5,926,210 A | 7/1999 | Hackett | |
| 5,928,291 A | 7/1999 | Jenkins | |
| 5,938,321 A | 8/1999 | Bos | |
| 5,946,404 A | 8/1999 | Bakshi | |
| 5,948,038 A | 9/1999 | Daly | |
| 5,959,367 A | 9/1999 | OFarrell | |
| 5,978,017 A | 11/1999 | Tino | |
| 6,002,326 A | 12/1999 | Turner | |
| 6,006,148 A | 12/1999 | Strong | |
| 6,008,723 A | 12/1999 | Yassan | |
| 6,008,841 A | 12/1999 | Charlson | |
| 6,009,370 A | 12/1999 | Minowa | |
| 6,011,492 A | 1/2000 | Garesche | |
| 6,028,528 A | 2/2000 | Lorenzetti | |
| 6,037,860 A | 3/2000 | Zander | |
| 6,037,977 A | 3/2000 | Peterson | |
| 6,041,410 A | 3/2000 | Hsu | |
| 6,049,079 A | 4/2000 | Noordam | |
| 6,057,754 A | 5/2000 | Kinoshita | |
| 6,060,989 A | 5/2000 | Gehlot | |
| 6,064,792 A | 5/2000 | Fox | |
| 6,067,488 A | 5/2000 | Tano | |
| 6,076,026 A | 6/2000 | Jambhekar | |
| 6,084,870 A | 7/2000 | Wooten | |
| 6,088,635 A | 7/2000 | Cox | |
| 6,092,008 A | 7/2000 | Bateman | |
| 6,092,021 A | 7/2000 | Ehlbeck | |
| 6,092,193 A | 7/2000 | Loomis | |
| 6,100,811 A | 8/2000 | Hsu | |
| 6,111,254 A | 8/2000 | Eden | |
| 6,118,768 A | 9/2000 | Bhatia | |
| 6,122,738 A | 9/2000 | Millard | |
| 6,141,611 A | 10/2000 | Mackey | |
| 6,144,296 A | 11/2000 | Ishida | |
| 6,147,598 A | 11/2000 | Murphy | |
| 6,151,065 A | 11/2000 | Steed | |
| 6,163,338 A | 12/2000 | Johnson | |
| 6,163,749 A | 12/2000 | McDonough | |
| 6,167,186 A | 12/2000 | Kawasaki | |
| 6,170,742 B1 | 1/2001 | Yacoob | |
| 6,181,373 B1 | 1/2001 | Coles | |
| 6,182,010 B1 | 1/2001 | Berstis | |
| 6,185,490 B1 | 2/2001 | Ferguson | |
| 6,195,605 B1 | 2/2001 | Tabler | |
| 6,200,139 B1 | 3/2001 | Clapper | |
| 6,208,919 B1 | 3/2001 | Barkesseh | |
| 6,211,907 B1 | 4/2001 | Scaman | |
| 6,218,960 B1 | 4/2001 | Ishikawa | |
| 6,246,933 B1 | 6/2001 | Bague | |
| 6,246,934 B1 | 6/2001 | Otake | |
| 6,252,544 B1 | 6/2001 | Hoffberg | |
| 6,253,129 B1 | 6/2001 | Jenkins | |
| 6,259,475 B1 | 7/2001 | Ramachandran | |
| 6,263,265 B1 | 7/2001 | Fera | |
| 6,266,588 B1 | 7/2001 | McClellan | |
| 6,298,290 B1 | 10/2001 | Abe | |
| 6,300,875 B1 | 10/2001 | Schafer | |
| 6,317,682 B1 | 11/2001 | Ogura | |
| 6,324,450 B1 | 11/2001 | Iwama | |
| 6,333,759 B1 | 12/2001 | Mazzilli | |
| 6,337,622 B1 | 1/2002 | Sugano | |
| 6,349,250 B1 | 2/2002 | Hart | |
| 6,353,734 B1 | 3/2002 | Wright | |
| 6,356,823 B1 | 3/2002 | Iannotti | |
| 6,360,147 B1 | 3/2002 | Lee | |
| 6,366,207 B1 | 4/2002 | Murphy | |
| 6,389,339 B1 | 5/2002 | Just | |
| 6,389,340 B1 | 5/2002 | Rayner | |
| 6,400,835 B1 | 6/2002 | Lemelson | |
| 6,405,112 B1 | 6/2002 | Rayner | |
| 6,405,132 B1 | 6/2002 | Breed | |
| 6,408,232 B1 | 6/2002 | Cannon | |
| 6,411,874 B2 | 6/2002 | Morgan | |
| 6,421,080 B1 | 7/2002 | Lambert | |
| 6,429,773 B1 | 8/2002 | Schuyler | |
| 6,434,510 B1 | 8/2002 | Callaghan | |

(56) References Cited

U.S. PATENT DOCUMENTS

| | | |
|---|---|---|
| 6,449,540 B1 | 9/2002 | Rayner |
| 6,456,321 B1 | 9/2002 | Ito |
| 6,459,988 B1 | 10/2002 | Fan |
| 6,470,241 B2 | 10/2002 | Yoshikawa |
| 6,472,771 B1 | 10/2002 | Frese |
| 6,490,513 B1 | 12/2002 | Fish |
| 6,493,650 B1 | 12/2002 | Rodgers |
| 6,505,106 B1 | 1/2003 | Lawrence |
| 6,507,838 B1 | 1/2003 | Syeda-Mahmood |
| 6,508,400 B1 | 1/2003 | Ishifuji |
| 6,516,256 B1 | 2/2003 | Hartmann |
| 6,518,881 B2 | 2/2003 | Monroe |
| 6,525,672 B2 | 2/2003 | Chainer |
| 6,526,352 B1 | 2/2003 | Breed |
| 6,529,159 B1 | 3/2003 | Fan |
| 6,535,804 B1 | 3/2003 | Chun |
| 6,552,682 B1 | 4/2003 | Fan |
| 6,553,308 B1 | 4/2003 | Uhlmann |
| 6,556,905 B1 | 4/2003 | Mittelsteadt |
| 6,559,769 B2 | 5/2003 | Anthony |
| 6,574,538 B2 | 6/2003 | Sasaki |
| 6,575,902 B1 | 6/2003 | Burton |
| 6,580,373 B1 | 6/2003 | Ohashi |
| 6,580,983 B2 | 6/2003 | Laguer-Diaz |
| 6,593,848 B1 | 7/2003 | Atkins, III |
| 6,594,576 B2 | 7/2003 | Fan |
| 6,611,740 B2 | 8/2003 | Lowrey |
| 6,611,755 B1 | 8/2003 | Coffee |
| 6,624,611 B2 | 9/2003 | Kirmuss |
| 6,629,029 B1 | 9/2003 | Giles |
| 6,629,030 B1 | 9/2003 | Klausner |
| 6,636,791 B2 | 10/2003 | Okada |
| 6,664,922 B1 | 12/2003 | Fan |
| 6,665,613 B2 | 12/2003 | Duvall |
| 6,679,702 B1 | 1/2004 | Rau |
| 6,684,137 B2 | 1/2004 | Takagi |
| 6,694,483 B1 | 2/2004 | Nagata |
| 6,701,234 B1 | 3/2004 | Vogelsang |
| 6,714,894 B1 | 3/2004 | Tobey |
| 6,718,239 B2 | 4/2004 | Rayner |
| 6,721,640 B2 | 4/2004 | Glenn |
| 6,721,652 B1 | 4/2004 | Sanqunetti |
| 6,728,612 B1 | 4/2004 | Carver |
| 6,732,031 B1 | 5/2004 | Lightner |
| 6,732,032 B1 | 5/2004 | Banet |
| 6,735,503 B2 | 5/2004 | Ames |
| 6,737,954 B2 | 5/2004 | Chainer |
| 6,738,697 B2 | 5/2004 | Breed |
| 6,739,078 B2 | 5/2004 | Morley |
| 6,741,168 B2 | 5/2004 | Webb |
| 6,745,153 B2 | 6/2004 | White |
| 6,747,692 B2 | 6/2004 | Patel |
| 6,748,305 B1 | 6/2004 | Klausner |
| 6,760,757 B1 | 7/2004 | Lundberg |
| 6,762,513 B2 | 7/2004 | Landgraf |
| 6,779,716 B1 | 8/2004 | Grow |
| 6,795,017 B1 | 9/2004 | Puranik |
| 6,795,111 B1 | 9/2004 | Mazzilli |
| 6,795,759 B2 | 9/2004 | Doyle |
| 6,798,743 B1 | 9/2004 | Ma |
| 6,804,590 B2 | 10/2004 | Sato |
| 6,810,362 B2 | 10/2004 | Adachi |
| 6,812,831 B2 | 11/2004 | Ikeda |
| 6,819,989 B2 | 11/2004 | Maeda |
| 6,831,556 B1 | 12/2004 | Boykin |
| 6,832,140 B2 | 12/2004 | Fan |
| 6,832,141 B2 | 12/2004 | Skeen |
| 6,836,712 B2 | 12/2004 | Nishina |
| 6,842,762 B2 | 1/2005 | Raithel |
| 6,847,873 B1 | 1/2005 | Li |
| 6,850,823 B2 | 2/2005 | Eun |
| 6,859,695 B2 | 2/2005 | Klausner |
| 6,859,705 B2 | 2/2005 | Rao |
| 6,862,524 B1 | 3/2005 | Nagda |
| 6,865,457 B1 | 3/2005 | Mittelsteadt |
| 6,867,733 B2 | 3/2005 | Sandhu |
| 6,873,261 B2 | 3/2005 | Anthony |
| 6,882,313 B1 | 4/2005 | Fan |
| 6,882,912 B2 | 4/2005 | DiLodovico |
| 6,894,606 B2 | 5/2005 | Forbes |
| 6,895,248 B1 | 5/2005 | Akyol |
| 6,898,492 B2 | 5/2005 | deLeon |
| 6,898,493 B2 | 5/2005 | Ehrman |
| 6,919,823 B1 | 7/2005 | Lock |
| 6,922,566 B2 | 7/2005 | Puranik |
| 6,928,348 B1 | 8/2005 | Lightner |
| 6,931,309 B2 | 8/2005 | Phelan |
| 6,947,817 B2 | 9/2005 | Diem |
| 6,950,122 B1 | 9/2005 | Mirabile |
| 6,954,223 B2 | 10/2005 | Miyazawa |
| 6,954,689 B2 | 10/2005 | Hanson |
| 6,988,034 B1 | 1/2006 | Marlatt |
| 7,003,289 B1 | 2/2006 | Kolls |
| 7,012,632 B2 | 3/2006 | Freeman |
| 7,020,548 B2 | 3/2006 | Saito |
| 7,023,333 B2 | 4/2006 | Blanco |
| 7,027,621 B1 | 4/2006 | Prokoski |
| 7,039,510 B2 | 5/2006 | Gumpinger |
| 7,076,348 B2 | 7/2006 | Bucher |
| 7,079,927 B1 | 7/2006 | Tano |
| 7,082,359 B2 | 7/2006 | Breed |
| 7,082,382 B1 | 7/2006 | Rose, Jr. |
| 7,088,387 B1 | 8/2006 | Freeman |
| 7,095,782 B1 | 8/2006 | Cohen |
| 7,098,812 B2 | 8/2006 | Hirota |
| 7,100,190 B2 | 8/2006 | Johnson |
| 7,113,853 B2 | 9/2006 | Hecklinger |
| 7,117,075 B1 | 10/2006 | Larschan |
| 7,119,832 B2 | 10/2006 | Blanco |
| 7,138,904 B1 | 11/2006 | Dutu |
| 7,155,321 B2 | 12/2006 | Bromley |
| 7,177,738 B2 | 2/2007 | Diaz |
| 7,209,833 B2 | 4/2007 | Isaji |
| 7,239,252 B2 | 7/2007 | Kato |
| 7,254,482 B2 | 8/2007 | Kawasaki |
| 7,265,663 B2 | 9/2007 | Steele |
| 7,266,507 B2 | 9/2007 | Simon |
| 7,272,179 B2 | 9/2007 | Siemens |
| 7,308,341 B2 | 12/2007 | Schofield |
| 7,317,974 B2 | 1/2008 | Luskin |
| 7,343,306 B1 | 3/2008 | Bates |
| 7,348,895 B2 | 3/2008 | Lagassey |
| 7,349,027 B2 | 3/2008 | Endo |
| 7,370,261 B2 | 5/2008 | Winarski |
| 7,382,933 B2 | 6/2008 | Dorai |
| 7,386,376 B2 | 6/2008 | Basir |
| 7,389,178 B2 | 6/2008 | Raz |
| 7,398,140 B2 | 7/2008 | Kernwein |
| 7,457,693 B2 | 11/2008 | Olsen |
| 7,471,189 B2 | 12/2008 | Vastad |
| 7,471,192 B2 | 12/2008 | Hara |
| 7,536,457 B2 | 5/2009 | Miller |
| 7,548,586 B1 * | 6/2009 | Mimar ............ G06T 1/20 375/240.26 |
| 7,561,054 B2 | 7/2009 | Raz |
| 7,584,033 B2 | 9/2009 | Mittelsteadt |
| 7,596,439 B2 | 9/2009 | Oesterling |
| 7,623,754 B1 | 11/2009 | McKain |
| 7,659,827 B2 | 2/2010 | Gunderson |
| 7,659,835 B2 | 2/2010 | Jung |
| 7,667,731 B2 | 2/2010 | Kreiner |
| 7,689,001 B2 | 3/2010 | Kim |
| 7,702,442 B2 | 4/2010 | Takenaka |
| 7,725,216 B2 | 5/2010 | Kim |
| 7,768,548 B2 | 8/2010 | Silvernail |
| 7,769,499 B2 | 8/2010 | McQuade |
| 7,783,956 B2 | 8/2010 | Ko |
| 7,804,426 B2 | 9/2010 | Etcheson |
| 7,821,421 B2 | 10/2010 | Tamir |
| 7,845,560 B2 | 12/2010 | Emanuel |
| 7,853,376 B2 | 12/2010 | Peng |
| 7,868,912 B2 * | 1/2011 | Venetianer ....... G08B 13/19673 348/143 |
| 7,893,958 B1 | 2/2011 | DAgostino |

(56) References Cited

U.S. PATENT DOCUMENTS

| | | |
|---|---|---|
| 7,904,219 B1 | 3/2011 | Lowrey |
| 7,940,250 B2 | 5/2011 | Forstall |
| 7,941,258 B1 | 5/2011 | Mittelsteadt |
| 7,974,748 B2 | 7/2011 | Goerick |
| 7,984,146 B2 | 7/2011 | Rozak |
| 8,054,168 B2 | 11/2011 | McCormick |
| 8,068,979 B2 | 11/2011 | Breed |
| 8,090,598 B2 | 1/2012 | Bauer |
| 8,113,844 B2 | 2/2012 | Huang |
| 8,139,820 B2 | 3/2012 | Plante |
| 8,140,265 B2 | 3/2012 | Grush |
| 8,140,358 B1 | 3/2012 | Ling |
| 8,152,198 B2 | 4/2012 | Breed |
| 8,239,092 B2 | 8/2012 | Plante |
| 8,269,617 B2 | 9/2012 | Cook |
| 8,311,858 B2 | 11/2012 | Everett |
| 8,314,708 B2 | 11/2012 | Gunderson |
| 8,321,066 B2 | 11/2012 | Becker |
| 8,373,567 B2 | 2/2013 | Denson |
| 8,417,562 B1 | 4/2013 | Siemens |
| 8,423,009 B2 | 4/2013 | Srinivasan |
| 8,442,690 B2 | 5/2013 | Goldstein |
| 8,471,701 B2 | 6/2013 | Yariv |
| 8,508,353 B2 | 8/2013 | Cook |
| 8,538,696 B1 | 9/2013 | Cassanova |
| 8,538,785 B2 | 9/2013 | Coleman |
| 8,564,426 B2 | 10/2013 | Cook |
| 8,564,446 B2 | 10/2013 | Gunderson |
| 8,571,755 B2 | 10/2013 | Plante |
| 8,577,703 B2 | 11/2013 | McClellan |
| 8,606,492 B1 | 12/2013 | Botnen |
| 8,634,958 B1 | 1/2014 | Chiappetta |
| 8,635,557 B2 | 1/2014 | Geise |
| 8,676,428 B2 | 3/2014 | Richardson |
| 8,744,642 B2 | 6/2014 | Nemat-Nasser |
| 8,775,067 B2 | 7/2014 | Cho |
| 8,781,292 B1 | 7/2014 | Ross |
| 8,803,695 B2 | 8/2014 | Denson |
| 8,805,110 B2 * | 8/2014 | Rhoads .............. G06K 9/00664 382/255 |
| 8,849,501 B2 | 9/2014 | Cook |
| 8,855,847 B2 | 10/2014 | Uehara |
| 8,862,395 B2 | 10/2014 | Richardson |
| 8,868,288 B2 | 10/2014 | Plante |
| 8,880,279 B2 | 11/2014 | Plante |
| 8,892,310 B1 | 11/2014 | Palmer |
| 8,989,959 B2 | 3/2015 | Plante |
| 8,996,234 B1 | 3/2015 | Tamari |
| 8,996,240 B2 | 3/2015 | Plante |
| 9,047,721 B1 | 6/2015 | Botnen |
| 9,085,362 B1 | 7/2015 | Kilian |
| 9,183,679 B2 | 11/2015 | Plante |
| 9,201,842 B2 | 12/2015 | Plante |
| 9,208,129 B2 | 12/2015 | Plante |
| 9,226,004 B1 | 12/2015 | Plante |
| 9,240,079 B2 | 1/2016 | Lambert |
| 9,373,203 B1 * | 6/2016 | Fields ..................... G07C 5/12 |
| 9,607,526 B1 | 3/2017 | Hsu-Hoffman |
| 9,610,955 B2 | 4/2017 | Palmer |
| 9,715,711 B1 | 7/2017 | Konrardy |
| 9,754,325 B1 | 9/2017 | Konrardy |
| 9,767,516 B1 | 9/2017 | Konrardy |
| 9,786,154 B1 | 10/2017 | Potter |
| 9,792,656 B1 | 10/2017 | Konrardy |
| 9,805,423 B1 | 10/2017 | Konrardy |
| 9,805,601 B1 | 10/2017 | Fields |
| 9,858,621 B1 | 1/2018 | Konrardy |
| 9,868,394 B1 | 1/2018 | Fields |
| 9,870,649 B1 | 1/2018 | Fields |
| 9,942,526 B2 | 4/2018 | Plante |
| 10,222,228 B1 * | 3/2019 | Chan .................. G01C 21/3697 |
| 10,360,739 B2 | 7/2019 | Palmer |
| 10,497,187 B2 | 12/2019 | Palmer |
| 10,682,969 B2 | 6/2020 | Plante |
| 10,706,648 B2 | 7/2020 | Plante |
| 2001/0005217 A1 | 6/2001 | Hamilton |
| 2001/0005804 A1 | 6/2001 | Rayner |
| 2001/0018628 A1 | 8/2001 | Jenkins |
| 2001/0020204 A1 | 9/2001 | Runyon |
| 2001/0020902 A1 | 9/2001 | Tamura |
| 2001/0052730 A1 | 12/2001 | Baur |
| 2002/0019689 A1 | 2/2002 | Harrison |
| 2002/0027502 A1 | 3/2002 | Mayor |
| 2002/0029109 A1 | 3/2002 | Wong |
| 2002/0035422 A1 | 3/2002 | Sasaki |
| 2002/0044225 A1 | 4/2002 | Rakib |
| 2002/0059453 A1 | 5/2002 | Eriksson |
| 2002/0061758 A1 | 5/2002 | Zarlengo |
| 2002/0067076 A1 | 6/2002 | Talbot |
| 2002/0087240 A1 | 7/2002 | Raithel |
| 2002/0091473 A1 | 7/2002 | Gardner |
| 2002/0105438 A1 | 8/2002 | Forbes |
| 2002/0107619 A1 | 8/2002 | Klausner |
| 2002/0111725 A1 | 8/2002 | Burge |
| 2002/0111756 A1 | 8/2002 | Modgil |
| 2002/0118206 A1 | 8/2002 | Knittel |
| 2002/0120374 A1 | 8/2002 | Douros |
| 2002/0135679 A1 | 9/2002 | Scaman |
| 2002/0138587 A1 | 9/2002 | Koehler |
| 2002/0156558 A1 | 10/2002 | Hanson |
| 2002/0163532 A1 | 11/2002 | Thomas |
| 2002/0169529 A1 | 11/2002 | Kim |
| 2002/0169530 A1 | 11/2002 | Laguer-Diaz |
| 2002/0170064 A1 | 11/2002 | Monroe |
| 2002/0183905 A1 | 12/2002 | Maeda |
| 2003/0016753 A1 | 1/2003 | Kim |
| 2003/0028298 A1 | 2/2003 | Macky |
| 2003/0053433 A1 | 3/2003 | Chun |
| 2003/0055557 A1 | 3/2003 | Dutta |
| 2003/0055666 A1 | 3/2003 | Roddy |
| 2003/0065805 A1 | 4/2003 | Barnes |
| 2003/0067541 A1 | 4/2003 | Joao |
| 2003/0079041 A1 | 4/2003 | Parrella |
| 2003/0080713 A1 | 5/2003 | Kirmuss |
| 2003/0080878 A1 | 5/2003 | Kirmuss |
| 2003/0081121 A1 | 5/2003 | Kirmuss |
| 2003/0081122 A1 | 5/2003 | Kirmuss |
| 2003/0081123 A1 | 5/2003 | Rupe |
| 2003/0081127 A1 | 5/2003 | Kirmuss |
| 2003/0081128 A1 | 5/2003 | Kirmuss |
| 2003/0081934 A1 | 5/2003 | Kirmuss |
| 2003/0081935 A1 | 5/2003 | Kirmuss |
| 2003/0095688 A1 | 5/2003 | Kirmuss |
| 2003/0112133 A1 | 6/2003 | Webb |
| 2003/0125854 A1 | 7/2003 | Kawasaki |
| 2003/0137194 A1 | 7/2003 | White |
| 2003/0144775 A1 | 7/2003 | Klausner |
| 2003/0152145 A1 * | 8/2003 | Kawakita ............... H04N 7/083 375/240.12 |
| 2003/0154009 A1 | 8/2003 | Basir |
| 2003/0158638 A1 | 8/2003 | Yakes |
| 2003/0177187 A1 | 9/2003 | Levine |
| 2003/0187704 A1 | 10/2003 | Hashiguchi |
| 2003/0191568 A1 | 10/2003 | Breed |
| 2003/0195678 A1 | 10/2003 | Betters |
| 2003/0201875 A1 | 10/2003 | Kuo |
| 2003/0214585 A1 | 11/2003 | Bakewell |
| 2003/0220835 A1 | 11/2003 | Barnes |
| 2003/0222880 A1 | 12/2003 | Waterman |
| 2004/0008255 A1 | 1/2004 | Lewellen |
| 2004/0032493 A1 | 2/2004 | Franke |
| 2004/0033058 A1 | 2/2004 | Reich |
| 2004/0039503 A1 | 2/2004 | Doyle |
| 2004/0039504 A1 | 2/2004 | Coffee |
| 2004/0044452 A1 | 3/2004 | Bauer |
| 2004/0044592 A1 | 3/2004 | Ubik |
| 2004/0054444 A1 | 3/2004 | Abeska |
| 2004/0054513 A1 | 3/2004 | Laird |
| 2004/0054689 A1 | 3/2004 | Salmonsen |
| 2004/0064245 A1 | 4/2004 | Knockeart |
| 2004/0070926 A1 | 4/2004 | Boykin |
| 2004/0083041 A1 | 4/2004 | Skeen |
| 2004/0088090 A1 | 5/2004 | Wee |
| 2004/0103008 A1 | 5/2004 | Wahlbin |

(56) References Cited

U.S. PATENT DOCUMENTS

| | | |
|---|---|---|
| 2004/0103010 A1 | 5/2004 | Wahlbin |
| 2004/0104842 A1 | 6/2004 | Drury |
| 2004/0111189 A1 | 6/2004 | Miyazawa |
| 2004/0117638 A1 | 6/2004 | Monroe |
| 2004/0135979 A1 | 7/2004 | Hazelton |
| 2004/0138794 A1 | 7/2004 | Saito |
| 2004/0145457 A1 | 7/2004 | Schofield |
| 2004/0153244 A1 | 8/2004 | Kellum |
| 2004/0153362 A1 | 8/2004 | Bauer |
| 2004/0167689 A1 | 8/2004 | Bromley |
| 2004/0179600 A1 | 9/2004 | Wells |
| 2004/0181326 A1 | 9/2004 | Adams |
| 2004/0184548 A1 | 9/2004 | Kerbiriou |
| 2004/0203903 A1 | 10/2004 | Wilson |
| 2004/0209594 A1 | 10/2004 | Naboulsi |
| 2004/0210353 A1 | 10/2004 | Rice |
| 2004/0230345 A1 | 11/2004 | Tzamaloukas |
| 2004/0230370 A1 | 11/2004 | Tzamaloukas |
| 2004/0230373 A1 | 11/2004 | Tzamaloukas |
| 2004/0230374 A1 | 11/2004 | Tzamaloukas |
| 2004/0233284 A1 | 11/2004 | Lesesky |
| 2004/0236474 A1 | 11/2004 | Chowdhary |
| 2004/0243285 A1 | 12/2004 | Gounder |
| 2004/0243308 A1 | 12/2004 | Irish |
| 2004/0243668 A1 | 12/2004 | Harjanto |
| 2004/0254689 A1 | 12/2004 | Blazic |
| 2004/0254698 A1 | 12/2004 | Hubbard |
| 2004/0257208 A1 | 12/2004 | Huang |
| 2004/0267419 A1 | 12/2004 | Jeng |
| 2005/0021199 A1 | 1/2005 | Zimmerman |
| 2005/0038581 A1 | 2/2005 | Kapolka |
| 2005/0043869 A1 | 2/2005 | Funkhouser |
| 2005/0060070 A1 | 3/2005 | Kapolka |
| 2005/0060071 A1 | 3/2005 | Winner |
| 2005/0065682 A1 | 3/2005 | Kapadia |
| 2005/0065716 A1 | 3/2005 | Timko |
| 2005/0068417 A1 | 3/2005 | Kreiner |
| 2005/0073585 A1 | 4/2005 | Ettinger |
| 2005/0078423 A1 | 4/2005 | Kim |
| 2005/0083404 A1 | 4/2005 | Pierce |
| 2005/0088291 A1 | 4/2005 | Blanco |
| 2005/0099498 A1 | 5/2005 | Lao |
| 2005/0100329 A1 | 5/2005 | Lao |
| 2005/0102074 A1 | 5/2005 | Kolls |
| 2005/0125117 A1 | 6/2005 | Breed |
| 2005/0131585 A1 | 6/2005 | Luskin |
| 2005/0131595 A1 | 6/2005 | Luskin |
| 2005/0131597 A1 | 6/2005 | Raz |
| 2005/0136949 A1 | 6/2005 | Barnes |
| 2005/0137757 A1 | 6/2005 | Phelan |
| 2005/0137796 A1 | 6/2005 | Gumpinger |
| 2005/0146458 A1 | 7/2005 | Carmichael |
| 2005/0149238 A1 | 7/2005 | Stefani |
| 2005/0149259 A1 | 7/2005 | Cherveny |
| 2005/0152353 A1* | 7/2005 | Couturier ............... H04L 47/70 370/389 |
| 2005/0159964 A1 | 7/2005 | Sonnenrein |
| 2005/0166258 A1 | 7/2005 | Vasilevsky |
| 2005/0168258 A1 | 8/2005 | Poskatcheev |
| 2005/0171663 A1 | 8/2005 | Mittelsteadt |
| 2005/0171692 A1 | 8/2005 | Hamblen |
| 2005/0174217 A1 | 8/2005 | Basir |
| 2005/0182538 A1 | 8/2005 | Phelan |
| 2005/0182824 A1 | 8/2005 | Cotte |
| 2005/0185052 A1 | 8/2005 | Raisinghani |
| 2005/0185936 A9 | 8/2005 | Lao |
| 2005/0192749 A1 | 9/2005 | Flann |
| 2005/0197748 A1 | 9/2005 | Hoist |
| 2005/0200714 A1 | 9/2005 | Marchese |
| 2005/0203683 A1 | 9/2005 | Olsen |
| 2005/0205719 A1 | 9/2005 | Hendrickson |
| 2005/0206741 A1 | 9/2005 | Raber |
| 2005/0209776 A1 | 9/2005 | Ogino |
| 2005/0212920 A1 | 9/2005 | Evans |
| 2005/0216144 A1 | 9/2005 | Baldassa |
| 2005/0228560 A1 | 10/2005 | Doherty |
| 2005/0233805 A1 | 10/2005 | Okajima |
| 2005/0243171 A1 | 11/2005 | Ross, Sr. |
| 2005/0251304 A1 | 11/2005 | Cancellara |
| 2005/0256681 A1 | 11/2005 | Brinton |
| 2005/0258942 A1 | 11/2005 | Manasseh |
| 2005/0264691 A1 | 12/2005 | Endo |
| 2005/0283284 A1 | 12/2005 | Grenier |
| 2006/0001671 A1 | 1/2006 | Kamijo |
| 2006/0007151 A1 | 1/2006 | Ram |
| 2006/0011399 A1 | 1/2006 | Brockway |
| 2006/0015233 A1 | 1/2006 | Olsen |
| 2006/0022842 A1 | 2/2006 | Zoladek |
| 2006/0025897 A1 | 2/2006 | Shostak |
| 2006/0025907 A9 | 2/2006 | Kapolka |
| 2006/0030986 A1 | 2/2006 | Peng |
| 2006/0040239 A1 | 2/2006 | Cummins |
| 2006/0047380 A1 | 3/2006 | Welch |
| 2006/0053038 A1 | 3/2006 | Warren |
| 2006/0055521 A1 | 3/2006 | Blanco |
| 2006/0057543 A1 | 3/2006 | Roald |
| 2006/0058950 A1 | 3/2006 | Kato |
| 2006/0072792 A1 | 4/2006 | Toda |
| 2006/0078853 A1 | 4/2006 | Lanktree |
| 2006/0082438 A1 | 4/2006 | Bazakos |
| 2006/0092043 A1 | 5/2006 | Lagassey |
| 2006/0095175 A1 | 5/2006 | deWaal |
| 2006/0095199 A1 | 5/2006 | Lagassey |
| 2006/0095349 A1 | 5/2006 | Morgan |
| 2006/0103127 A1 | 5/2006 | Lie |
| 2006/0106514 A1 | 5/2006 | Liebl |
| 2006/0111817 A1 | 5/2006 | Phelan |
| 2006/0122749 A1 | 6/2006 | Phelan |
| 2006/0129578 A1* | 6/2006 | Kim ................... H04N 21/231 |
| 2006/0142913 A1 | 6/2006 | Coffee |
| 2006/0143435 A1* | 6/2006 | Kwon ................ G06Q 20/382 713/150 |
| 2006/0147187 A1 | 7/2006 | Takemoto |
| 2006/0158349 A1 | 7/2006 | Oesterling |
| 2006/0161960 A1 | 7/2006 | Benoit |
| 2006/0168271 A1 | 7/2006 | Pabari |
| 2006/0178793 A1 | 8/2006 | Hecklinger |
| 2006/0180647 A1 | 8/2006 | Hansen |
| 2006/0184295 A1 | 8/2006 | Hawkins |
| 2006/0192658 A1 | 8/2006 | Yamamura |
| 2006/0200008 A1 | 9/2006 | Moore-Ede |
| 2006/0200305 A1 | 9/2006 | Sheha |
| 2006/0204059 A1 | 9/2006 | Ido |
| 2006/0209090 A1 | 9/2006 | Kelly |
| 2006/0209840 A1 | 9/2006 | Paatela |
| 2006/0212195 A1 | 9/2006 | Veith |
| 2006/0215884 A1 | 9/2006 | Ota |
| 2006/0226344 A1 | 10/2006 | Werth |
| 2006/0229780 A1 | 10/2006 | Underdahl |
| 2006/0242680 A1 | 10/2006 | Johnson |
| 2006/0247833 A1 | 11/2006 | Malhotra |
| 2006/0253307 A1 | 11/2006 | Warren |
| 2006/0259218 A1 | 11/2006 | Wu |
| 2006/0259933 A1 | 11/2006 | Fishel |
| 2006/0261931 A1 | 11/2006 | Cheng |
| 2007/0001831 A1 | 1/2007 | Raz |
| 2007/0005404 A1 | 1/2007 | Raz |
| 2007/0027583 A1 | 2/2007 | Tamir |
| 2007/0027726 A1 | 2/2007 | Warren |
| 2007/0035632 A1 | 2/2007 | Silvernail |
| 2007/0043487 A1 | 2/2007 | Krzystofczyk |
| 2007/0088488 A1 | 4/2007 | Reeves |
| 2007/0100509 A1 | 5/2007 | Piekarz |
| 2007/0120948 A1 | 5/2007 | Fujioka |
| 2007/0124332 A1 | 5/2007 | Ballesty |
| 2007/0127833 A1 | 6/2007 | Singh |
| 2007/0132773 A1 | 6/2007 | Plante |
| 2007/0135979 A1 | 6/2007 | Plante |
| 2007/0135980 A1 | 6/2007 | Plante |
| 2007/0136078 A1 | 6/2007 | Plante |
| 2007/0142986 A1 | 6/2007 | Alaous |
| 2007/0143499 A1 | 6/2007 | Chang |
| 2007/0150138 A1 | 6/2007 | Plante |
| 2007/0150140 A1 | 6/2007 | Seymour |

(56) References Cited

U.S. PATENT DOCUMENTS

| | | | |
|---|---|---|---|
| 2007/0159309 A1* | 7/2007 | Ito | G16H 10/20 340/425.5 |
| 2007/0173994 A1 | 7/2007 | Kubo | |
| 2007/0179691 A1 | 8/2007 | Grenn | |
| 2007/0183635 A1 | 8/2007 | Weidhaas | |
| 2007/0208494 A1 | 9/2007 | Chapman | |
| 2007/0213920 A1 | 9/2007 | Igarashi | |
| 2007/0216521 A1 | 9/2007 | Guensler | |
| 2007/0217670 A1 | 9/2007 | Bar-Am | |
| 2007/0219685 A1 | 9/2007 | Plante | |
| 2007/0219686 A1 | 9/2007 | Plante | |
| 2007/0236474 A1 | 10/2007 | Ramstein | |
| 2007/0241874 A1 | 10/2007 | Okpysh | |
| 2007/0244614 A1 | 10/2007 | Nathanson | |
| 2007/0253307 A1 | 11/2007 | Mashimo | |
| 2007/0257781 A1 | 11/2007 | Denson | |
| 2007/0257782 A1 | 11/2007 | Etcheson | |
| 2007/0257804 A1 | 11/2007 | Gunderson | |
| 2007/0257815 A1 | 11/2007 | Gunderson | |
| 2007/0260677 A1 | 11/2007 | DeMarco | |
| 2007/0262855 A1 | 11/2007 | Zuta | |
| 2007/0263984 A1 | 11/2007 | Sterner | |
| 2007/0268158 A1 | 11/2007 | Gunderson | |
| 2007/0271105 A1 | 11/2007 | Gunderson | |
| 2007/0273480 A1 | 11/2007 | Burkman | |
| 2007/0279214 A1 | 12/2007 | Buehler | |
| 2007/0280677 A1 | 12/2007 | Drake | |
| 2007/0299612 A1 | 12/2007 | Kimura | |
| 2008/0035108 A1 | 2/2008 | Ancimer | |
| 2008/0059019 A1 | 3/2008 | Delia | |
| 2008/0071827 A1 | 3/2008 | Hengel | |
| 2008/0111666 A1 | 5/2008 | Plante | |
| 2008/0122603 A1 | 5/2008 | Plante | |
| 2008/0137912 A1 | 6/2008 | Kim | |
| 2008/0143834 A1 | 6/2008 | Comeau | |
| 2008/0147267 A1 | 6/2008 | Plante | |
| 2008/0157510 A1 | 7/2008 | Breed | |
| 2008/0167775 A1 | 7/2008 | Kuttenberger | |
| 2008/0169914 A1 | 7/2008 | Albertson | |
| 2008/0177436 A1 | 7/2008 | Fortson | |
| 2008/0195261 A1* | 8/2008 | Breed | B60N 2/0232 701/2 |
| 2008/0204556 A1 | 8/2008 | de Miranda | |
| 2008/0211779 A1 | 9/2008 | Pryor | |
| 2008/0234920 A1 | 9/2008 | Nurminen | |
| 2008/0243389 A1 | 10/2008 | Inoue | |
| 2008/0252412 A1 | 10/2008 | Larsson | |
| 2008/0252485 A1 | 10/2008 | Lagassey | |
| 2008/0252487 A1 | 10/2008 | McClellan | |
| 2008/0269978 A1 | 10/2008 | Shirole | |
| 2008/0281485 A1 | 11/2008 | Plante | |
| 2008/0309762 A1 | 12/2008 | Howard | |
| 2008/0319604 A1 | 12/2008 | Follmer | |
| 2009/0009321 A1 | 1/2009 | McClellan | |
| 2009/0043500 A1 | 2/2009 | Satoh | |
| 2009/0043971 A1 | 2/2009 | Kim | |
| 2009/0051510 A1 | 2/2009 | Follmer | |
| 2009/0138191 A1 | 5/2009 | Engelhard | |
| 2009/0157255 A1 | 6/2009 | Plante | |
| 2009/0216775 A1 | 8/2009 | Ratliff | |
| 2009/0224869 A1 | 9/2009 | Baker | |
| 2009/0290848 A1 | 11/2009 | Brown | |
| 2009/0299622 A1 | 12/2009 | Denaro | |
| 2009/0312998 A1 | 12/2009 | Berckmans | |
| 2009/0326796 A1 | 12/2009 | Prokhorov | |
| 2009/0327856 A1 | 12/2009 | Mouilleseaux | |
| 2010/0030423 A1 | 2/2010 | Nathanson | |
| 2010/0045451 A1 | 2/2010 | Periwal | |
| 2010/0047756 A1 | 2/2010 | Schneider | |
| 2010/0049516 A1 | 2/2010 | Talwar | |
| 2010/0054709 A1* | 3/2010 | Misawa | G06F 3/1454 386/239 |
| 2010/0057342 A1 | 3/2010 | Muramatsu | |
| 2010/0063672 A1 | 3/2010 | Anderson | |
| 2010/0063680 A1 | 3/2010 | Tolstedt | |
| 2010/0063850 A1 | 3/2010 | Daniel | |
| 2010/0070175 A1 | 3/2010 | Soulchin | |
| 2010/0076621 A1 | 3/2010 | Kubotani | |
| 2010/0085193 A1 | 4/2010 | Boss | |
| 2010/0085430 A1 | 4/2010 | Kreiner | |
| 2010/0087984 A1 | 4/2010 | Joseph | |
| 2010/0100315 A1 | 4/2010 | Davidson | |
| 2010/0103165 A1* | 4/2010 | Lee | H04N 13/183 345/419 |
| 2010/0104199 A1 | 4/2010 | Zhang | |
| 2010/0149418 A1* | 6/2010 | Freed | H04N 5/20 348/572 |
| 2010/0153146 A1 | 6/2010 | Angell | |
| 2010/0157061 A1 | 6/2010 | Katsman | |
| 2010/0191411 A1 | 7/2010 | Cook | |
| 2010/0201875 A1* | 8/2010 | Rood | G09F 27/00 348/552 |
| 2010/0220892 A1 | 9/2010 | Kawakubo | |
| 2010/0250020 A1 | 9/2010 | Lee | |
| 2010/0250022 A1 | 9/2010 | Hines | |
| 2010/0250060 A1 | 9/2010 | Maeda | |
| 2010/0250116 A1 | 9/2010 | Yamaguchi | |
| 2010/0253918 A1 | 10/2010 | Seder | |
| 2010/0268415 A1 | 10/2010 | Ishikawa | |
| 2010/0283633 A1 | 11/2010 | Becker | |
| 2010/0312464 A1 | 12/2010 | Fitzgerald | |
| 2011/0035139 A1 | 2/2011 | Konlditslotis | |
| 2011/0043624 A1 | 2/2011 | Haug | |
| 2011/0060496 A1 | 3/2011 | Nielsen | |
| 2011/0077028 A1 | 3/2011 | Wilkes | |
| 2011/0091079 A1 | 4/2011 | Yu-Song | |
| 2011/0093159 A1 | 4/2011 | Boling | |
| 2011/0112995 A1 | 5/2011 | Chang | |
| 2011/0121960 A1 | 5/2011 | Tsai | |
| 2011/0125365 A1 | 5/2011 | Larschan | |
| 2011/0130916 A1 | 6/2011 | Mayer | |
| 2011/0140884 A1 | 6/2011 | Santiago | |
| 2011/0145042 A1 | 6/2011 | Green | |
| 2011/0153367 A1 | 6/2011 | Amigo | |
| 2011/0161116 A1 | 6/2011 | Peak | |
| 2011/0166773 A1 | 7/2011 | Raz | |
| 2011/0169625 A1 | 7/2011 | James | |
| 2011/0172864 A1 | 7/2011 | Syed | |
| 2011/0173015 A1 | 7/2011 | Chapman | |
| 2011/0208428 A1 | 8/2011 | Matsubara | |
| 2011/0212717 A1 | 9/2011 | Rhoads | |
| 2011/0213628 A1 | 9/2011 | Peak | |
| 2011/0224891 A1 | 9/2011 | Iwuchukwu | |
| 2011/0251752 A1 | 10/2011 | DeLarocheliere | |
| 2011/0251782 A1 | 10/2011 | Perkins | |
| 2011/0254676 A1 | 10/2011 | Marumoto | |
| 2011/0257882 A1 | 10/2011 | McBurney | |
| 2011/0273568 A1 | 11/2011 | Lagassey | |
| 2011/0282542 A9 | 11/2011 | Nielsen | |
| 2011/0283223 A1 | 11/2011 | Vaittinen | |
| 2011/0304446 A1 | 12/2011 | Basson | |
| 2012/0021386 A1 | 1/2012 | Anderson | |
| 2012/0035788 A1 | 2/2012 | Trepagnier | |
| 2012/0041675 A1 | 2/2012 | Juliver | |
| 2012/0046803 A1 | 2/2012 | Inou | |
| 2012/0065834 A1 | 3/2012 | Senart | |
| 2012/0071140 A1 | 3/2012 | Oesterling | |
| 2012/0078063 A1 | 3/2012 | Moore-Ede | |
| 2012/0081567 A1 | 4/2012 | Cote | |
| 2012/0100509 A1 | 4/2012 | Gunderson | |
| 2012/0109447 A1 | 5/2012 | Yousefi | |
| 2012/0123806 A1 | 5/2012 | Schumann | |
| 2012/0134547 A1 | 5/2012 | Jung | |
| 2012/0150436 A1 | 6/2012 | Rossano | |
| 2012/0176234 A1 | 7/2012 | Taneyhill | |
| 2012/0190001 A1 | 7/2012 | Knight | |
| 2012/0198317 A1 | 8/2012 | Eppolito | |
| 2012/0203402 A1 | 8/2012 | Jape | |
| 2012/0210252 A1 | 8/2012 | Fedoseyeva | |
| 2012/0269383 A1 | 10/2012 | Bobbitt | |
| 2012/0277950 A1 | 11/2012 | Plante | |
| 2012/0280835 A1 | 11/2012 | Raz | |
| 2012/0283895 A1 | 11/2012 | Noda | |

(56) References Cited

U.S. PATENT DOCUMENTS

| | | | |
|---|---|---|---|
| 2012/0330528 A1* | 12/2012 | Schwindt | G01S 13/52 |
| | | | 701/96 |
| 2013/0004138 A1 | 1/2013 | Kilar | |
| 2013/0006469 A1 | 1/2013 | Green | |
| 2013/0018534 A1 | 1/2013 | Hilleary | |
| 2013/0021148 A1 | 1/2013 | Cook | |
| 2013/0028320 A1* | 1/2013 | Gardner | H04N 21/631 |
| | | | 375/240.12 |
| 2013/0030660 A1 | 1/2013 | Fujimoto | |
| 2013/0046449 A1 | 2/2013 | Yuecel | |
| 2013/0048795 A1 | 2/2013 | Cross | |
| 2013/0052614 A1 | 2/2013 | Mollicone | |
| 2013/0073112 A1 | 3/2013 | Phelan | |
| 2013/0073114 A1 | 3/2013 | Nemat-Nasser | |
| 2013/0096731 A1 | 4/2013 | Tamari | |
| 2013/0127980 A1 | 5/2013 | Haddick | |
| 2013/0145269 A1 | 6/2013 | Latulipe | |
| 2013/0151980 A1* | 6/2013 | Lee | G06F 16/954 |
| | | | 715/738 |
| 2013/0170762 A1* | 7/2013 | Marti | H04N 19/88 |
| | | | 382/232 |
| 2013/0189649 A1 | 7/2013 | Mannino | |
| 2013/0197774 A1 | 8/2013 | Denson | |
| 2013/0209968 A1 | 8/2013 | Miller | |
| 2013/0274950 A1 | 10/2013 | Richardson | |
| 2013/0278631 A1 | 10/2013 | Border | |
| 2013/0317711 A1 | 11/2013 | Plante | |
| 2013/0332004 A1 | 12/2013 | Gompert | |
| 2013/0345927 A1 | 12/2013 | Cook | |
| 2013/0345929 A1* | 12/2013 | Bowden | B60R 1/00 |
| | | | 701/36 |
| 2014/0025225 A1 | 1/2014 | Armitage | |
| 2014/0025254 A1 | 1/2014 | Plante | |
| 2014/0032062 A1 | 1/2014 | Baer | |
| 2014/0046550 A1 | 2/2014 | Palmer | |
| 2014/0047371 A1 | 2/2014 | Palmer | |
| 2014/0058583 A1 | 2/2014 | Kesavan | |
| 2014/0089504 A1* | 3/2014 | Scholz | H04L 65/80 |
| | | | 709/224 |
| 2014/0094992 A1 | 4/2014 | Lambert | |
| 2014/0098228 A1 | 4/2014 | Plante | |
| 2014/0152828 A1 | 6/2014 | Plante | |
| 2014/0226010 A1 | 8/2014 | Molin | |
| 2014/0232863 A1* | 8/2014 | Paliga | H04N 21/278 |
| | | | 348/143 |
| 2014/0270684 A1 | 9/2014 | Jayaram | |
| 2014/0279707 A1 | 9/2014 | Joshua | |
| 2014/0280204 A1 | 9/2014 | Avery | |
| 2014/0300739 A1* | 10/2014 | Mimar | G08B 21/06 |
| | | | 348/148 |
| 2014/0309849 A1 | 10/2014 | Ricci | |
| 2014/0335902 A1 | 11/2014 | Guba | |
| 2014/0336916 A1 | 11/2014 | Yun | |
| 2014/0339374 A1 | 11/2014 | Mian | |
| 2015/0000415 A1 | 1/2015 | Kelley | |
| 2015/0015617 A1 | 1/2015 | Yeo | |
| 2015/0035665 A1 | 2/2015 | Plante | |
| 2015/0057512 A1 | 2/2015 | Kapoor | |
| 2015/0057836 A1 | 2/2015 | Plante | |
| 2015/0105934 A1 | 4/2015 | Palmer | |
| 2015/0112542 A1 | 4/2015 | Fuglewicz | |
| 2015/0112545 A1 | 4/2015 | Binion | |
| 2015/0134226 A1 | 5/2015 | Palmer | |
| 2015/0135240 A1* | 5/2015 | Shibuya | H04N 21/2347 |
| | | | 725/81 |
| 2015/0156174 A1* | 6/2015 | Fahey | H04L 63/0428 |
| | | | 713/168 |
| 2015/0170428 A1 | 6/2015 | Harter | |
| 2015/0189042 A1* | 7/2015 | Sun | H04L 67/32 |
| | | | 709/217 |
| 2015/0203116 A1 | 7/2015 | Fairgrieve | |
| 2015/0022449 A1 | 8/2015 | Salinger | |
| 2015/0222449 A1* | 8/2015 | Salinger | H04L 27/0002 |
| | | | 370/419 |
| 2015/0317846 A1 | 11/2015 | Plante | |
| 2015/0371462 A1 | 12/2015 | Ramesh | |
| 2016/0054733 A1 | 2/2016 | Hollida | |
| 2016/0182170 A1 | 6/2016 | Daoura | |
| 2017/0301220 A1 | 10/2017 | Jarrell | |
| 2018/0025636 A1 | 1/2018 | Boykin | |
| 2018/0033300 A1 | 2/2018 | Hansen | |
| 2019/0176837 A1* | 6/2019 | Williams | G06F 3/165 |
| 2019/0176847 A1 | 6/2019 | Palmer | |
| 2019/0180524 A1 | 6/2019 | Palmer | |
| 2019/0389307 A1 | 12/2019 | Plante | |

FOREIGN PATENT DOCUMENTS

| | | |
|---|---|---|
| CA | 2692415 | 8/2011 |
| CA | 2692415 A1 | 8/2011 |
| DE | 4416991 A1 | 11/1995 |
| DE | 20311262 | 9/2003 |
| DE | 202005008238 | 8/2005 |
| DE | 102004004669 | 12/2005 |
| DE | 102004004669 A1 | 12/2005 |
| EP | 0708427 A2 | 4/1996 |
| EP | 0840270 A2 | 5/1998 |
| EP | 0848270 A2 | 6/1998 |
| EP | 1170697 A2 | 1/2002 |
| EP | 1324274 A2 | 7/2003 |
| EP | 1355278 A1 | 10/2003 |
| EP | 1427165 A2 | 6/2004 |
| EP | 1818873 A1 | 8/2007 |
| EP | 2104075 | 9/2009 |
| EP | 2320387 | 5/2011 |
| EP | 2407943 | 1/2012 |
| GB | 244694 | 9/1926 |
| GB | 02056197 | 2/1990 |
| GB | 2268608 A | 1/1994 |
| GB | 2402530 | 12/2004 |
| GB | 2402530 A | 12/2004 |
| GB | 2447184 B | 9/2008 |
| GB | 2451485 | 2/2009 |
| JP | 58085110 | 5/1983 |
| JP | S5885110 A | 5/1983 |
| JP | 62091092 | 4/1987 |
| JP | S6291092 A | 4/1987 |
| JP | S62166135 A | 7/1987 |
| JP | H0256197 A | 2/1990 |
| JP | H04257189 A | 9/1992 |
| JP | H05137144 A | 6/1993 |
| JP | H08124069 A | 5/1996 |
| JP | H09163357 A | 6/1997 |
| JP | H09272399 A | 10/1997 |
| JP | 10076880 | 3/1998 |
| JP | H1076880 A | 3/1998 |
| JP | 2002191017 | 7/2002 |
| JP | 2002191017 A | 7/2002 |
| JP | 5294188 | 5/2009 |
| KR | 20000074416 A * | 12/2000 |
| KR | 1000588169 | 6/2006 |
| WO | 8809023 A1 | 11/1988 |
| WO | 9005076 | 5/1990 |
| WO | 9427844 | 12/1994 |
| WO | 9600957 A1 | 1/1996 |
| WO | 9701246 | 1/1997 |
| WO | 9726750 A1 | 7/1997 |
| WO | 9937503 | 7/1999 |
| WO | 9940545 A1 | 8/1999 |
| WO | 9962741 | 12/1999 |
| WO | 0007150 A1 | 2/2000 |
| WO | 0028410 A1 | 5/2000 |
| WO | 0048033 | 8/2000 |
| WO | 0077620 | 12/2000 |
| WO | 0123214 | 4/2001 |
| WO | 0125054 | 4/2001 |
| WO | 0146710 A2 | 6/2001 |
| WO | 03045514 | 6/2003 |
| WO | 2004066275 | 8/2004 |
| WO | 2005095175 A1 | 10/2005 |
| WO | 2006022824 | 3/2006 |
| WO | 2006022824 A2 | 3/2006 |
| WO | 2007067767 | 1/2007 |

(56) References Cited

FOREIGN PATENT DOCUMENTS

| WO | 2007109091 | | 9/2007 |
|---|---|---|---|
| WO | 2009081234 | | 7/2009 |
| WO | 2011055743 | A1 | 5/2011 |
| WO | 2013072939 | | 5/2013 |
| WO | 2013159853 | | 10/2013 |

OTHER PUBLICATIONS

"DriveCam Driving Feedback System", DriveCam brochure, Jun. 12, 2001, Document #6600128, 2 pages.
"DriveCam Passenger Transportation Module", DriveCam brochure, Oct. 26, 2001, 2 pages.
"DriveCam Video Event Data Recorder", DriveCam brochure, Nov. 6, 2002, Document #6600127, 2 pages.
"DriveCam, Inc's Disclosure of Proposed Constructions and Extrinsic Evidence Pursuant to Patent L.R. 4.1.a & 4.1.b" *Disclosure and Extrinsic Evidence in DriveCam, Inc. v. SmartDrive Systems, Inc.*, Case No. 3:11-CV-00997-H-RBB, for the Southern District of California. Nov. 8, 2011, 68 pages.
"Responsive Claim Construction and Identification of Extrinsic Evidence of Defendani/Counterclaimant SmartDrive Systems, Inc." *Claim Construction and and Extrinsic Evidence in DriveCam, Inc. v. SmartDrive Systems, Inc.*, Case No. 3:11-CV-00997-H (RBB), for the Southern District of California. Nov. 15, 2011, 20 pages.
"Sonic MyDVD 4.0: Tutorial: Trimming video segments". Tutorial for software bundled with Adaptec VideoOh! DVD USB 2.0 Edition, 2003, 13 pages.
"User's Manual for DriveCam Video Systems' HindSight 20/20 Software Version 4.0" DriveCam Manual, San Diego, 2003, Document #6600141-1, 54 pages.
Adaptec published and sold its VideoOh! DVD software USB 2.0 Edition in at least Jan. 24, 2003. (1 pg.).
Ambulance Companies Use Video Technology to Improve Driving Behavior, Ambulance Industry Journal, Spring 2003 (2 pgs.).
Amended Complaint for Patent Infringement, Trade Secret Misappropriation, Unfair Competition and Conversion in *DriveCam, Inc. v. SmartDrive Systems, Inc.*, Case No. 3:11-CV-00997-H-RBB, for the Southern District of California, Document 34, filed Oct. 20, 2011, pp. 1-15.
Amendment filed Dec. 23, 2009 during prosecution of U.S. Appl. No. 11/566,424 (13 pgs.).
Answer to Amended Complaint; Counterclaims; and Demand for Jury Trial in *DriveCam, Inc. v. SmartDrive Systems, Inc.*, Case No. 3:11-CV-00997 H (RBB), for the Southern District of California, Document 47, filed Dec. 13, 2011, pp. 1-15.
U.S. Appl. No. 11/296,906, filed Dec. 8, 2005, File History (279 pgs.).
U.S. Appl. No. 11/297,669, filed Dec. 8, 2005, File History (183 pgs.).
U.S. Appl. No. 11/297,889, filed Dec. 8, 2005, File History (77 pgs.).
U.S. Appl. No. 11/298,069, filed Dec. 9, 2005, File History (105 pgs.).
U.S. Appl. No. 11/299,028, filed Dec. 9, 2005, File History (181 pgs.).
U.S. Appl. No. 11/593,659, filed Nov. 7, 2006, File History (296 pgs.).
U.S. Appl. No. 11/593,682, filed Nov. 7, 2006, File History (173 pgs.).
U.S. Appl. No. 11/593,882, filed Nov. 7, 2006, File History (94 pgs.).
U.S. Appl. No. 11/595,015, filed Nov. 9, 2006, File History (171 pgs.).
U.S. Appl. No. 11/637,754, filed Dec. 13, 2006, File History (241 pgs.).
U.S. Appl. No. 11/637,755, filed Dec. 13, 2006, File History (171 pgs.).
Bill Siuru, 'DriveCam Could Save You Big Bucks', Land Line Magazine, May-Jun. 2000 (1 pg.).
Bill, 'DriveCam-FAQ', Dec. 12, 2003 (3 pgs.).
Canadian Office Action issued in Application No. 2,632,685 dated Jan. 30, 2015; 5 pages.
Chris Woodyard, 'Shuttles save with DriveCam', Dec. 9, 2003 (1 pg.).
Dan Carr, Flash Video Template: Video Presentation with Navigation, Jan. 16, 2006, http://www.adobe.com/devnet/fiash/articles/vidtemplate_mediapreso_flash8.html (13 pgs.).
Dan Maher, "DriveCam Taking Risk Out of Driving", DriveCam brochure folder, Jun. 6, 2005, 6 pages.
David Cullen, 'Getting a real eyeful', Fleet Owner Magazine, Feb. 2002 (1 pg.).
David Maher, 'DriveCam Brochure Folder', Jun. 6, 2005 (2 pg.).
David Maher, "DriveCam Brochure Folder", Jun. 8, 2005 (2 pg.).
David Vogeleer et al., Macromedia Flash Professional 8UNLEASHED (Sams Oct. 12, 2005). (4 pgs.).
Del Lisk, 'DriveCam Training Handout Ver4', Feb. 3, 2005 (16 pgs.).
Del Lisk, "DriveCam Training Seminar" Handout, 2004, 16 pages.
DriveCam Driving Feedback System, Mar. 15, 2004 (12 pgs.).
DriveCam Extrinsic Evidence with Patent LR 4.1 .a Disclosures, Nov. 3, 2011. (1 pg.).
DriveCam Extrinsic Evidence with Patent LR 4.1 .a Disclosures, Nov. 8, 2011. (1 pg.).
DriveCam—Illuminator Data Sheet, Oct. 2, 2004. (1 pg.).
Drivecam, Inc., User's Manual for Drivecam Video Systems' Hindsight 20/20 Software Version 4.0 (2003). (54 pgs.).
DriveCam, Inc.'s Infringement Contentions Exhibit A, U.S. Pat. No. 6,389,340, Document 34.1, Oct. 20, 2011. (10 pgs.).
DriveCam, Inc.'s Infringement Contentions Exhibit B, U.S. Pat. No. 7,659,827. Aug. 19, 2011. (29 pgs.).
DriveCam, Inc.'s Infringement Contentions Exhibit B, U.S. Pat. No. 7,804,426, Document 34.2, Oct. 20, 2011. (20 pg.).
DriveCam, Inc.'s Infringement Contentions Exhibit C, U.S. Pat. No. 7,659,827, Document 34.3, Oct. 20, 2011. (17 pgs.).
DriveCam, Inc.'s Infringement Contentions Exhibit C, U.S. Pat. No. 7,804,426. Aug. 19, 2011. (47 pgs.).
DriveCam, Inc.'s Infringement Contentions Exhibit D, Document 34.4, Oct. 20, 2011. (2 pgs.).
Drivecam.com as retrieved by the Internet Wayback Machine as of Mar. 5, 2005(1 pg.).
DriveCam's Disclosure of Asserted Claims and Preliminary Infringement Contentions in *DriveCam, Inc. v. SmartDrive Systems, Inc.*, Case No. 3:11-CV-00997-H-RBB, for the Southern District of California. Aug. 19, 2011. (6 pgs.).
Driver Feedback System, Jun. 12, 2001 (1 pg.).
Edwin Olson, A Passive Solution to the Sensor Synchronization Problem, the 2010 IEEE/RSJ International Conference on Intelligent Robots and Systems, Oct. 18-22, 2010, 6 pages.
European Examination Report issued in EP 07772812.9 dated Jan. 22, 2015; 5 pages.
First Amended Answer to Amended Complaint and First Amended Counterclaims; and Demand for Jury Trial in *DriveCam, Inc. v. SmartDrive Systems, Inc.*, Case No. 3:11-CV-00997 H (RBB), for the Southern District of California, Exhibit A, Document 55, filed Jan. 3, 2012, pp. 49-103.
First Amended Answer to Amended Complaint and First Amended Counterclaims; and Demand for Jury Trial in *DriveCam, Inc. v. SmartDrive Systems, Inc.*, Case No. 3:11-CV-00997 H (RBB), for the Southern District of California, Document 53, filed Dec. 20, 2011, pp. 1-48.
First Amended Answer to Amended Complaint and First Amended Counterclaims; and Demand for Jury Trial in *DriveCam, Inc. v. SmartDrive Systems, Inc.*, Case No. 3:11-CV-00997 H (RBB), for the Southern District of California, Document 55, filed Jan. 1, 2012, pp. 86-103.
First Amended Answer to Amended Complaint and First Amended Counterclaims; and Demand for Jury Trial in *DriveCam, Inc. v. SmartDrive Systems, Inc.*, Case No. 3:11-CV-00997 H (RBB), for the Southern District of California, Document 55, filed Jan. 3, 2012, pp. 86-103.

(56) References Cited

OTHER PUBLICATIONS

Franke, U., et al., Autonomous Driving Goes Downtown, IEEE Intelligent Systems, 13(6):40-48 (1988); Digital Object Identifier 10.1109/5254.736001.
Gallagher, B., et al., Wireless Communications for Vehicle Safety: Radio Link Performance and Wireless Connectivity Methods, Vehicular Technology Magazine, IEEE, 1(4):4-24 (2006); Digital Object Identifier 10.1109/MVT.2006.343641.
Gandhi, T., et al., Pedestrian Protection Systems: Issues, Survey, and Challenges, IEEE Transactions on Intelligent Transportation Systems, 8(3):413-430 (2007); Digital Object Identifier 10.1109/TITS.2007.903444.
Gary and Sophia Rayner, Final Report for Innovations Deserving Exploratory Analysis (IDEA) Intelligent Transportation Systems (ITS) Programs' Project 84, I-Witness Black Box Recorder, San Diego, CA. Nov. 2001. (19 pgs.).
GE published its VCR User's Guide for Model VG4255 in 1995. (44 pgs.).
Glenn Oster, 'Hindsight 20/20 v4.0 Software Installation', 1 of 2, Jun. 20, 2003 (2 pgs.).
Glenn Oster, 'HindSight 20/20 v4.0 Software Installation', 2 of 2, Jun. 20, 2003. (54 pgs.).
Glenn Oster, 'Illuminator Installation', Oct. 3, 2004 (2 pgs.).
Hans Fantel, Video; Search Methods Make a Difference in Picking VCR's, NY Times, Aug. 13, 1989. (1 pg.).
I/O Port Racing Supplies' website discloses using Traqmate's Data Acquisition with Video Overlay system in conjunction with professional driver coaching sessions (available at http://www.ioportracing.com/Merchant2/merchant.mvc?Screen=CTGY&Categorys- ub.--Code=coaching)., printed from site on Jan. 11, 2012. (4 pgs.).
Inovate Motorsports, OT-1 16 Channel OBD-II Interface User Manual, Version 1.0, Nov. 28, 2007, pp. 3, 4, 21 & 27.
Interior Camera Data Sheet, Oct. 26, 2001 (2 pgs.).
International Search Report and Written Opinion issued in PCT/US07/68325 dated Feb. 27, 2008. (10 pgs.).
International Search Report and Written Opinion issued in PCT/US07/68325 dated Feb. 27, 2008. (2 pgs.).
International Search Report and Written Opinion issued in PCT/US07/68328 dated Oct. 15, 2007. (2 pgs.).
International Search Report and Written Opinion issued in PCT/US07/68329 dated Mar. 3, 2008. (10 pgs.).
International Search Report and Written Opinion issued in PCT/US07/68332 dated Mar. 3, 2008. (8 pgs.).
International Search Report and Written Opinion issued in PCT/US07/68334 dated Mar. 5, 2008. (11 pgs.).
International Search Report for PCTUS2006/47055, dated Mar. 20, 2008 (2 pp.).
International Search Report issued in PCT/US2006/47042 dated Feb. 25, 2008 (3pgs.).
J. Gallagher, 'Lancer Recommends Tech Tool', Insurance and Technology Magazine, Feb. 2002 (1 pg.).
Jean (DriveCam vendor) "DriveCam Driving Feedback System", DriveCam brochure, Nov. 6, 2002, Document #6600128-1, 2 pages.
Jean (DriveCam vendor), 'DC Data Sheet', Nov. 6, 2002. (1 pg.).
Jean (DriveCam vendor), 'DriveCam brochure', Nov. 6, 2002. (4 pgs.).
Jean (DriveCam vendor), 'Feedback Data Sheet', Nov. 6, 2002. (1 pg.).
Jean (DriveCam vendor), 'Hindsight 20-20 Data Sheet', Nov. 4, 2002 (2 pg.).
Jessyca Wallace, 'Analyzing and Processing DriveCam Recorded Events', Oct. 6, 2003 (8 pgs.).
Jessyca Wallace, 'Overview of the DriveCam Program', Dec. 15, 2005 (13 pgs.).
Jessyca Wallace, 'The DriveCam Driver Feedback System', Apr. 6, 2004 (21 pgs.).
Joint Claim Construction Chart in *DriveCam, Inc.* v. *SmartDrive Systems, Inc.*, Case No. 11-CV-0997-H (RBB), for the Southern District of California, Document 43, filed Dec. 1, 2011, pp. 1-2.
Joint Claim Construction Chart, U.S. Pat. No. 6,389,340, 'Vehicle Data Recorder' for Case No. 3:11-CV-00997-H-RBB, Document 43-1, filed Dec. 1, 2011, pp. 1-33.
Joint Claim Construction Worksheet in *DriveCam, Inc.* v. *SmartDrive Systems, Inc.*, Case No. 3:11-CV-00997 H (RBB), for the Southern District of California, Document 44, filed Dec. 1, 2011, pp. 1-2.
Joint Claim Construction Worksheet, U.S. Pat. No. 6,389,340, "Vehicle Data Reporter" for Case No. 3:11-CV-00997-H-RBB, Document 44-1, filed Dec. 1, 2011, pp. 1-10.
Joint Motion for Leave to Supplement Disclosure of Asserted Claims and Preliminary Infringement Contentions in *DriveCam, Inc.* v. *SmartDrive Systems, Inc.*, Case No. 3:11-CV-00997-H-RBB, Document 29, filed Oct. 12, 2011, pp. 1-7.
Julie Stevens, 'DriveCam Services', Nov. 15, 2004 (9 pgs.).
Julie Stevens, 'Program Support Roll-Out & Monitoring', Jul. 13, 2004 (2 pgs.).
Jung, Sang-Hack, et al., Egomotion Estimation in Monocular Infrared Image Sequence for Night Vision Applications, IEEE Workshop on Applications of Computer Vision (WACV '07), Feb. 2007, 6 pgs.; Digital Object Identifier 10.1109/WACV.2007.20.
JVC Company of America, JVC Video Cassette Recorder HR-IP820U Instructions (1996). (44 pgs.).
Kamijo, S., et al., A Real-Time Traffic Monitoring System by Stochastic Model Combination, IEEE International Conference on Systems, Man and Cybernetics, 4:3275-3281 (2003).
Kamijo, S., et al., An Incident Detection System Based on Semantic Hierarchy, Proceedings of the 7th International IEEE Intelligent Transportation Systems Conference, Oct. 3-6, 2004, pp. 853-858; Digital Object Identifier 10.1109/ITSC.2004.1399015.
Karen, 'Downloading Options to HindSight 20120', Aug. 6, 2002. (15 pgs.).
Karen, 'Managers Guide to the DriveCam Driving Feedback System', Jul. 30, 2002 (11 pgs.).
Kathy Latus (Latus Design), 'Case Study—Time Warner Cable', Sep. 23, 2005. (1 pg.).
Kathy Latus (Latus Design), 'Case Study—Cloud 9 Shuttle', Sep. 23, 2005 (1 pg.).
Kathy Latus (Latus Design), 'Case Study—Lloyd Pest Control', Jul. 19, 2005 (1 pg.).
Ki, Yong-Kul, et al., A Traffic Accident Detection Model using Metadata Registry, Proceedings of the Fourth International Conference on Software Engineering Research, Management and Applications; Aug. 9-11, 2006 pp. 255-259 Digital Object Identifier 10.1109/SERA.2006.8.
Kitchin, Charles. "Understanding accelerometer scale factor and offset adjustments." Analog Devices (1995). (4 pgs.).
Lin, Chin-Teng et al., EEG-based drowsiness estimation for safety driving using independent component analysis; IEEE Transactions on Circuits and Systems-I: Regular Papers, 52(12):2726-2738 (2005); Digital Object Identifier 10.1109/TCSI.2005.857555.
Lisa Mckenna, 'A Fly on the Windshield?', Pest Control Technology Magazine, Apr. 2003 (2 pgs.).
Inovate Motorsports, OT-1 16 Channel 0BD-II Interface User Manual, Version 1.0, Nov. 28, 2007, pp. 3, 4, 21 and 27.
Miller, D.P., Evaluation of Vision Systems for Teleoperated Land Vehicles. Control Systems Magazine, IEEE, 8(3):37-41 (1988); Digital Identifier 10.1109/37.475.
Munder, S., et al., Pedestrian Detection and Tracking Using a Mixture of View-Based Shape-Texture Models, IEEE Transactions on Intelligent Transportation Systems, 9(2):333-343 (2008); Digital Identifier 10.1109/TITS.2008.922943.
Notice of Allowance Application for U.S. Appl. No. 11/566,424, dated Feb. 26, 2010, 6 pages.
Notice of Allowance for U.S. Appl. No. 11/377,164, dated Dec. 3, 2014, 5 pages.
Notice of Allowance for U.S. Appl. No. 11/377,164, dated Feb. 13, 2015, 2 pages.
Notice of Allowance for U.S. Appl. No. 11/377,164, date Feb. 25, 2014, 2 pages.
Notice of Allowance for U.S. Appl. No. 11/377,164, dated Nov. 18, 2013, 7 pages.
Notice of Allowance for U.S. Appl. No. 11/377,167, dated Apr. 1, 2015, 7 pages.

(56) References Cited

OTHER PUBLICATIONS

Notice of Allowance for U.S. Appl. No. 11/800,876, dated Apr. 19, 2012, 8 pages.
Notice of Allowance for U.S. Appl. No. 13/957,810, dated Jun. 8, 2015, 10 pages.
Olson, E, A passive solution to the sensor synchronization problem, Intelligent Robots and Systems (IROS), Technical Fields 2010 IEEE/RSJ International Conference on, IEEE, Piscataway, NJ, USA, Searched (IPC) Oct. 18, 2010 (Oct. 18, 2010, pp. 1059-1064, XP031920438, DOI: 10.1109/IROS.2010.5650579 ISBN: 978-1-4244-6674-0.
Panasonic Corporation, Video Cassette Recorder (VCR) Operating Instructions for Models No. PV-V4020/PV-V4520. (40 pgs.).
Passenger Transportation Mode Brochure, May 2, 2005. (2 pgs.).
Patent Abstracts of Japan vol. 007, No. 180 (P-215), Aug. 9, 1983 (Aug. 9, 1983) & JP 58 085110 A (Mitsuhisa Ichikawa), May 21, 1983 (May 21, 1983) (1 pg.).
Patent Abstracts of Japan vol. 011, No. 292 (E-543), Sep. 19, 1987 (Sep. 19, 1987) & JP 62 091092 A (OK ENG:KK), Apr. 25, 1987 (Apr. 25, 1987) (1 pg.).
Patent Abstracts of Japan vol. 012, No. 001 (M-656), Jan. 6, 1988 (Jan. 6, 1988) & JP 62 166135 A (Fuji Electric Co Ltd), Jul. 22, 1987 (Jul. 22, 1987) (1 pg.).
Patent Abstracts of Japan vol. 014, No. 222 (E-0926), May 10, 1990 (May 10, 1990) & JP 02 056197 A (Sanyo Electric Co Ltd), Feb. 26, 1990 (Feb. 26, 1990) (1 pg.).
Patent Abstracts of Japan vol. 017, No. 039 (E-1311), Jan. 25, 1993 (Jan. 25, 1993) & JP 04 257189 A (Sony Corp), Sep. 11, 1992 (Sep. 11, 1992) (1 pg.).
Patent Abstracts of Japan vol. 017, No. 521 (E-1435), Sep. 20, 1993 (Sep. 20, 1993) & JP 05 137144 A (Kyocera Corp), Jun. 1, 1993 (Jun. 1, 1993) (7 pgs.).
Patent Abstracts of Japan vol. 1996, No. 09, Sep. 30, 1996 (Sep. 30, 1996) & JP 08 124069 A (Toyota Motor Corp), May 17, 1996 (May 17, 1996) (15 pgs.).
Patent Abstracts of Japan vol. 1997, No. 10, Oct. 31, 1997 (Oct. 31, 1997) & JP 09 163357 A (Nippon Soken Inc), Jun. 20, 1997 (Jun. 20, 1997) (1 pg.).
Patent Abstracts of Japan vol. 1998, No. 02, Jan. 30, 1998 (Jan. 30, 1998) & JP 09 272399 A (Nippon Soken Inc), Oct. 21, 1997 (Oct. 21, 1997) (1 pg.).
Patent Abstracts of Japan vol. 1998, No. 8, Jun. 30, 1998 (Jun. 30, 1998) & JP 10 076880 A (Muakami Corp), Mar. 24, 1998 (Mar. 24, 1998) (1 pg.).
PCT International Search Report and Written Opinion for PCT/IB16/51863, dated Sep. 16, 2016 (18 pgs.).
PCT International Search Report and Written Opinion for PCT/US15/60721 dated Feb. 26, 2016, 11 pages.
PCT International Search Report and Written Opinion for PCT/US2016/012757 dated Mar. 18, 2016 (11 pgs.).
PCT/US2010/022012, Invitation to Pay Additional Fees with Communication of Partial International Search, Jul. 21, 2010. (4 pgs.).
Peter G. Thurlow, Letter (including exhibits) Regarding Patent Owner's Response to Initial Office Action in Ex Parte Reexamination, Mar. 27, 2012. (78 pgs.).
Preliminary Claim Construction and Identification of Extrinsic Evidence of Defendant/Counterclaimant SmartDriveSystems, Inc.' in *DriveCam, Inc.* v. *SmartDrive Systems, Inc.*, Case No. 3:11-CV-00997-H (RBB), for the Southern District of California. Nov. 8, 2011. (13 pgs.).
Quinn Maughan, 'DriveCam Enterprise Services', Jan. 5, 2006 (2 pgs.).
Quinn Maughan, 'DriveCam Managed Services', Jan. 5, 2006. (2 pgs.).
Quinn Maughan, 'DriveCam Standard Edition', Jan. 5, 2006. (2 pgs.).
Quinn Maughan, 'DriveCam Unit Installation', Jul. 21, 2005 (9 pgs.).
Quinn Maughan, 'Enterprise Services', Apr. 17, 2006 (2 pgs.).
Quinn Maughan, 'Enterprise Services', Apr. 7, 2006 (2 pgs.).
Quinn Maughan, 'Hindsight Installation Guide', Sep. 29, 2005 (55 pgs.).
Quinn Maughan, 'Hindsight Users Guide', Jun. 7, 2005 (80 pgs.).
Ronnie Rittenberry, 'Eyes on the Road', Jul. 2004 (2 pgs.).
SmartDrives Systems, Inc's Production, SO14246-S014255, Nov. 16, 2011 (1 pg.).
Supplement to DriveCam's Disclosure of Asserted Claims and Preliminary Infringement Contentions' in *DriveCam, Inc.* v. *SmartDrive Systems, Inc.*, Case No. 3:11-CV-00997-H-RBB, for the Southern District of California. Oct. 14, 2011. (7 pgs.).
The DriveCam, Nov. 6, 2002. (2 pgs.).
The DriveCam, Nov. 8, 2002 (2 pgs.).
Traqmate GPS Data Acquisition's Traqmate Data Acquisition with Video Overlay system was used to create a video of a driving event on Oct. 2, 2005 (available at http://www.trackvision.net/phpBB2/viewtopic.php?t=51&sid=1184fbbcbe3be5c87ffa0f2ee6e2da76), printed from site on Jan. 11, 2012. (4 pgs.).
Trivinci Systems, LLC, "Race-Keeper System User Guide", V1 .1.02, Jan. 2011, p. 21.
Trivinci Systems, LLC, Race-Keeper Systems User Guide, Jan. 2011, v1, 1.02, pp. 34 and 39.
U.S. Appl. No. 12/691,639, entitled 'Driver Risk Assessment System and Method Employing Selectively Automatic Event Scoring', filed Jan. 21, 2010. (52 pgs.).
U.S. Appl. No. 11/377,167, Final Office Action dated Nov. 8, 2013. (19 pgs.).
U.S. Appl. No. 11/377,157, filed Mar. 16, 2006 entitled, "Vehicle Event Recorder Systems and Networks Having Parallel Communications Links" (28 pgs.).
U.S. Appl. No. 11/377,167, filed Mar. 16, 2006 entitled, "Vehicle Event Recorder Systems and Networks Having Integrated Cellular Wireless Communications Systems" (29 pgs.).
USPTO Final Office Action for U.S. Appl. No. 11/296,906, dated Aug. 8, 2012, 15 pages.
USPTO Final Office Action for U.S. Appl. No. 11/297,669, dated Nov. 7, 2011, 15 pages.
USPTO Final Office Action for U.S. Appl. No. 12/096,591, dated Dec. 5, 2014, 23 pages.
USPTO Final Office Action for U.S. Appl. No. 12/096,591, dated Jul. 18, 2012, 15 pages.
USPTO Final Office Action for U.S. Appl. No. 12/096,591, dated Nov. 7, 2013, 14 pages.
USPTO Final Office Action for U.S. Appl. No. 13/957,810, dated Jun. 27, 2014, 22 pages.
USPTO Final Office Action for U.S. Appl. No. 13/957,810, dated Jun. 27, 2014, 24 pages.
USPTO Final Office Action for U.S. Appl. No. 14/036,299, dated Feb. 24, 2015, 9 pages.
USPTO Non-Final Office Action for U.S. Appl. No. 11/296,906, dated Apr. 2, 2009, 7 pages.
USPTO Non-Final Office Action for U.S. Appl. No. 11/296,906, dated Apr. 8, 2014, 19 pages.
USPTO Non-Final Office Action for U.S. Appl. No. 11/296,906, dated Jun. 12, 2012, 13 pages.
USPTO Non-Final Office Action for U.S. Appl. No. 11/296,906, dated Nov. 6, 2009, 9 pages.
USPTO Non-Final Office Action for U.S. Appl. No. 11/297,669, dated Apr. 28, 2011, 11 pages.
USPTO Non-Final Office Action for U.S. Appl. No. 11/299,028, dated Apr. 24, 2008, 9 pages.
USPTO Non-Final Office Action for U.S. Appl. No. 11/377,164, dated Apr. 7, 2014, 7 pages.
USPTO Non-Final Office Action for U.S. Appl. No. 11/377,164, dated Aug. 18, 2014, 5 pages.
USPTO Non-Final Office Action for U.S. Appl. No. 11/377,164, dated Nov. 19, 2007, 7 pages.
USPTO Non-Final Office Action for U.S. Appl. No. 11/377,164, dated Nov. 25, 2011, 9 pages.
USPTO Non-Final Office Action for U.S. Appl. No. 11/377,164, dated Sep. 10, 2012, 10 pages.
USPTO Non-Final Office Action for U.S. Appl. No. 11/377,164, dated Sep. 11, 2008, 8 pages.

(56) References Cited

OTHER PUBLICATIONS

USPTO Non-Final Office Action for U.S. Appl. No. 11/377,167, dated Jun. 27, 2013, 11 pages.
USPTO Non-Final Office Action for U.S. Appl. No. 11/377,167, dated Jun. 5, 2008, 11 pages.
USPTO Non-Final Office Action for U.S. Appl. No. 11/800,876, dated Dec. 1, 2010, 12 pages.
USPTO Non-Final Office Action for U.S. Appl. No. 11/800,876, dated Dec. 20, 2011, 8 pages.
USPTO Non-Final Office Action for U.S. Appl. No. 12/096,591, dated Jun. 14, 2011, 8 pages.
USPTO Non-Final Office Action for U.S. Appl. No. 12/096,591, dated Mar. 27, 2013, 16 pages.
USPTO Non-Final Office Action for U.S. Appl. No. 12/096,591, dated May 20, 2014, 19 pages.
USPTO Non-Final Office Action for U.S. Appl. No. 13/957,810, dated Apr. 17, 2015, 6 pages.
USPTO Non-final Office Action for U.S. Appl. No. 13/957,810, dated Nov. 27, 2013, 18 pages.
USPTO Non-Final Office Action for U.S. Appl. No. 14/036,299, dated Aug. 12, 2014. (14 pgs.).
USPTO Non-Final Office Action for U.S. Appl. No. 11/296,907, dated Mar. 22, 2007 (17 pages).
USPTO Non-final Office Action dated Aug. 27, 2009 during prosecution of U.S. Appl. No. 11/566,424 (25 pgs.).
USPTO Non-Final Office Action dated Jan. 4, 2016 in U.S. Appl. No. 14/529,134, filed Oct. 30, 2014 (65 pgs).
USPTO Non-Final Office Action dated Nov. 27, 2013 in U.S. Appl. No. 13/957,810, filed Aug. 2, 2013. (19 pgs.).
Veeraraghavan, H., et al., Computer Vision Algorithms for Intersection Monitoring, IEEE Transactions on Intelligent Transportation Systems, 4(2):78-89 (2003); Digital Object Identifier 10.1109/TITS.2003.821212.
Wijesoma, W.S., et al., Road Curb Tracking in an Urban Environment, Proceedings of the Sixth International Conference of Information Fusion, 1:261-268 (2003).
World News Tonight, CBC Television New Program discussing teen drivers using the DriveCam Program and DriveCam Technology, Oct. 10, 2005, on PC formatted CD-R, World News Tonight.wmv, 7.02 MB, Created Jan. 12, 2011. (1 pg.).
Written Opinion issued in PCT/US07/68328 dated Oct. 15, 2007. (3 pgs.).
Written Opinion of the International Searching Authority for PCT/US2006/47042, dated Feb. 25, 2008 (5 pages).
Written Opinion of the International Searching Authority for PCT/US2006/47055, dated Mar. 20, 2008 (5 pages).
History of the web browser, Wikipedia (Year: 2019) (8 pages).

\* cited by examiner

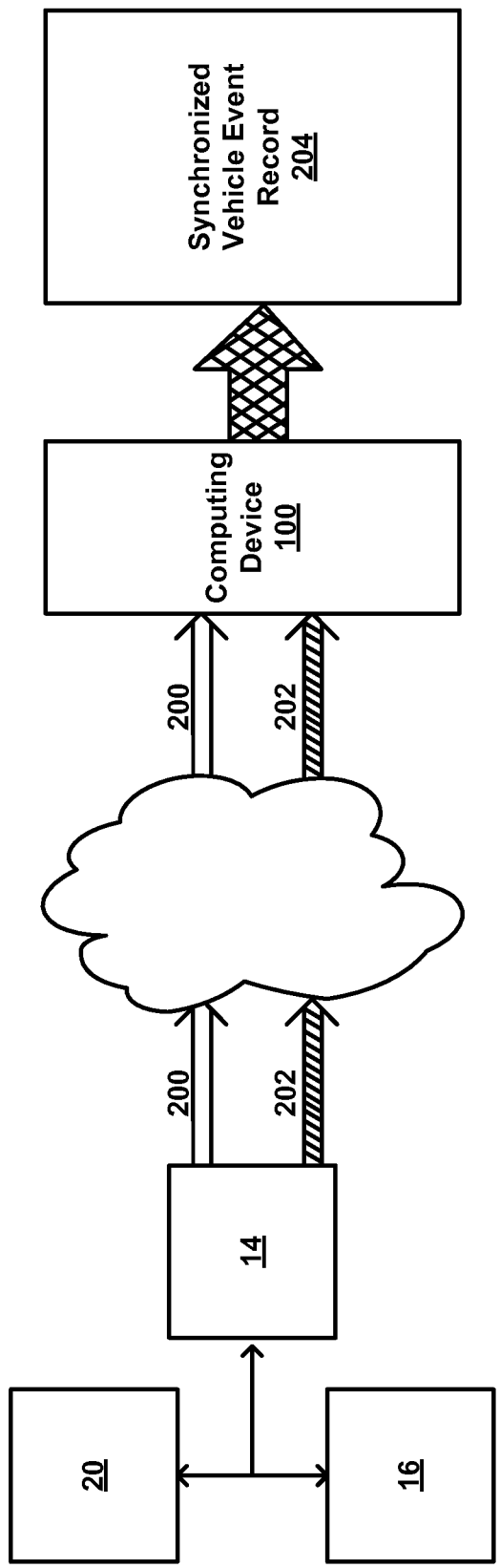

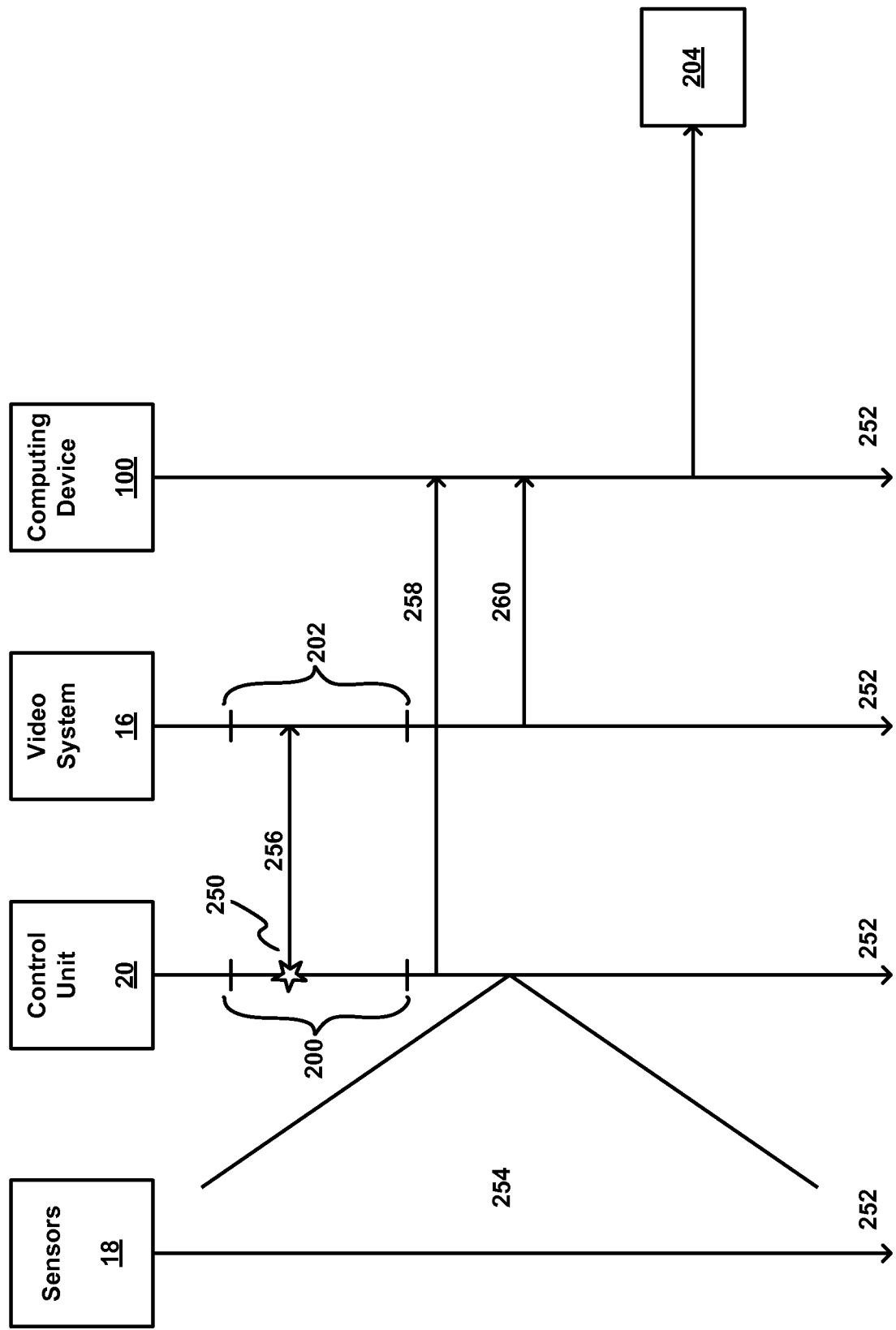

VEHICLE EVENT RECORDING SYSTEM AND METHOD

FIELD

This disclosure relates to a system configured to generate a synchronized electronic vehicle event record.

BACKGROUND

Systems configured to record, store, and transmit video, audio, and sensor data associated with a vehicle responsive to an accident involving the vehicle are known. Typically, such systems include an aftermarket video camera as an integral part of the system and detect an accident based on data from sensors such as an accelerometer mounted on the vehicle. Vehicle data and video from an accident are generated and stored locally on a device coupled with the vehicle as a single electronic file associated with the accident.

SUMMARY

One aspect of this disclosure relates to a system configured to generate synchronized electronic vehicle event records. The synchronized electronic vehicle event records may correspond to vehicle events involving a vehicle. The synchronized vehicle event records may include vehicle operation information, video information, and/or other information. The synchronized electronic vehicle event records may be generated remotely (e.g., "in the cloud") from the vehicle by one or more computing devices. The system may include a control unit coupled with the vehicle configured to detect the vehicle events and transmit vehicle event information that includes vehicle operation information that corresponds to detected vehicle events. The control unit may be configured to communicate with factory installed and/or other (e.g., third party) external vehicle systems to generate the vehicle event information and/or cause other information relevant to a particular vehicle event to be transmitted in addition to the vehicle event information. By communicating with existing vehicle systems and causing these systems to transmit information related to vehicle events themselves, and generating the synchronized electronic vehicle event records remotely from the vehicle, the system reduces the amount and/or cost of aftermarket equipment that must be installed in the vehicle for vehicle event monitoring.

In some implementations, the system may include one or more of a communication device, a sensor, the control unit, a video system, a user interface, electronic storage, a remote computing device, and/or other components. In some implementations, the remote computing device may include one or more of a processor, a user interface, electronic storage, and/or other components.

The control unit may be configured to transmit vehicle event information to the remote computing device over a network. The control unit may be coupled with the vehicle. The vehicle event information may include vehicle operation information that corresponds to the detected vehicle events. In some implementations, the control unit may be configured such that the detected vehicle events have individual start times and individual end times, and the vehicle event information includes vehicle operation information for periods of time that last from before and/or about the individual start times until about and/or after the individual end times.

The video system may be configured such that video information captured during the periods of time for the vehicle events is transmitted to the remote computing device over the network separate from the vehicle event information. In some implementations, the control unit may be configured to, responsive to detecting individual vehicle events, cause the video system to transmit video information for periods of time that correspond to the detected vehicle events to the computing device. In some implementations, the control unit may be configured to cause the video system to designate which frames of visual information are associated with the individual periods of time that correspond to the individual vehicle events and cause the video system to separately (from the vehicle event information) transmit the designated visual information to the computing device.

In some implementations, the remote computing system may be configured to receive, over the network, the vehicle event information transmitted from the control unit and the video information transmitted from the video system. The remote computing system may be configured to analyze the received vehicle event information and the received video information and, based on such analysis, correlate vehicle event information for the detected vehicle events with received video information captured during the periods of time for the detected vehicle events. The remote computing system may be configured to generate event records that include or identify the video information captured during the periods of time for the detected vehicle events and the vehicle event information for the detected vehicle events. The remote computing system may be configured to synchronize the vehicle event information and the video information by identifying and correlating corresponding phenomena in the vehicle event information and the video information during the vehicle event.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 2A illustrates separate transmission of vehicle event information and video information.

FIG. 2B uses a timeline to illustrate detection of a vehicle event and subsequent transmission of vehicle event information and video information to a computing device.

DETAILED DESCRIPTION

Figure 1:
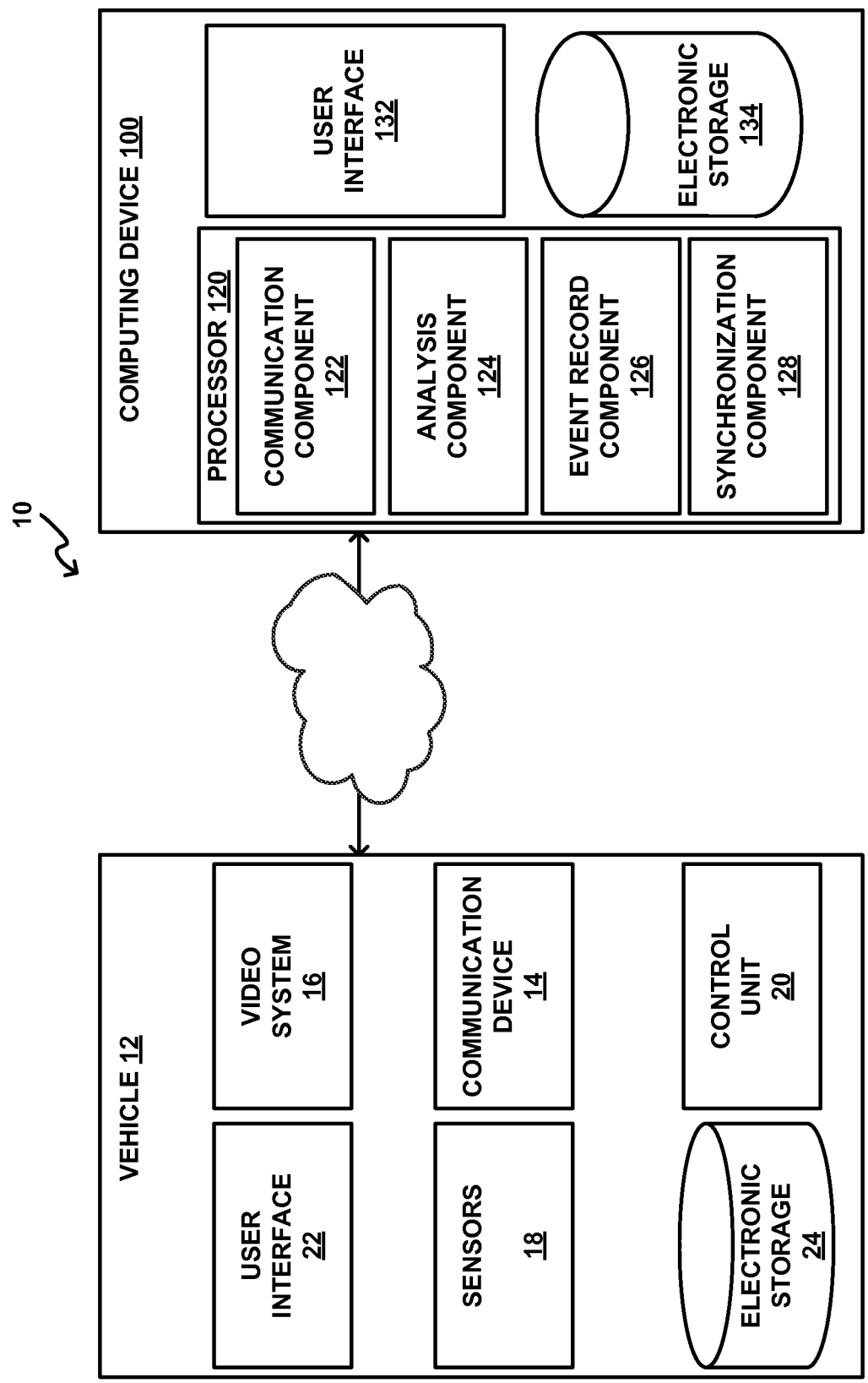
FIG. 1 illustrates a system configured to generate a synchronized electronic vehicle event record.

FIG. 1 illustrates a system 10 configured to generate synchronized electronic vehicle event records. The synchronized electronic vehicle event records may correspond to vehicle events involving a vehicle 12 and/or other vehicles. The synchronized vehicle event records may include vehicle operation information, video information, and/or other information. The synchronized electronic vehicle event records may be generated remotely (e.g., "in the cloud") from vehicle 12 by one or more computing devices 100. System 10 includes a control unit 20 coupled with vehicle 12 configured to detect the vehicle events and transmit vehicle event information that includes vehicle operation information that corresponds to detected vehicle events. Control unit 20 may be configured to communicate with factory installed and/or other (e.g., third party) external (to system 10) vehicle systems (mechanical systems of the vehicle, electrical systems of the vehicle, safety systems of the vehicle, location determination systems of the vehicle, video systems of the vehicle, etc.) to generate the vehicle event information and/or cause other information relevant to a particular vehicle event to be transmitted in addition to the vehicle event information. For example, control unit 20 may be configured to cause a video system 16 to transmit video information captured during periods of time that include the detected vehicle events. By communicating with existing vehicle systems and causing these systems to transmit information related to vehicle events themselves, and generating the synchronized electronic vehicle event records remotely from vehicle 12, system 10 reduces the amount and/or cost of aftermarket equipment that must be installed in vehicle 12 for vehicle event monitoring. In some implementations, system 10 may facilitate determination and/or derivation of various vehicle and/or driver performance characteristics that are not determined in real-time and/or by individual sensors 18 and/or control unit 20 alone.

Vehicle(s) 12 may include automobiles, trucks, delivery vehicles, planes, trains, and/or any other type of vehicle where detecting vehicle events and generating synchronized electronic vehicle event records may be useful. In some implementations, system 10 may include one or more of a communication device 14, a sensor 18 (e.g., one or more sensors 18), control unit 20, video system 16, a user interface 22, electronic storage 24, computing device 100, and/or other components. In some implementations, computing device 100 may include one or more of a processor 120, a user interface 132, electronic storage 134, and/or other components.

Communication device 14 may be configured to facilitate communication between vehicle 12, video system 16, control unit 20, computing device 100, other components of system 10, and/or other computing devices. In some implementations, communication device 14 may be a factory and/or other previously installed communication device coupled with vehicle 12. In some implementations, communication device 14 may be an aftermarket device coupled with vehicle 12 as part of control unit 20, for example. Communication device 14 may be configured to facilitate communication between vehicle 12 and/or components of system 10 coupled with vehicle 12, and computing device 100 and/or other computing devices wirelessly via a network such as the internet and/or other networks, for example. In some implementations, communication device 14 may include one or more of a router and/or other devices that facilitate network connectivity, a transceiver, a signal processor, and/or other components. In some implementations, communication device 14 may be configured to transmit and receive communication signals substantially simultaneously. In some implementations, control unit 20 and video system 16 transmit and/or receive information via communication device 14. However, this is not intended to be limiting. In some implementations, control unit 20 and/or video system 16 communicate with computing device 100 directly (e.g., via the network).

Sensors 18 may be configured to generate output signals conveying information related to the operation and/or the context of vehicle 12. One or more sensors 18 may be coupled with vehicle 12. Information related to the operation and/or context of vehicle 12 may include feedback information from one or more of the mechanical systems of vehicle 12, and/or other information. The mechanical systems of vehicle 12 may include, for example, the engine, the drive train, the lighting systems (e.g., headlights, brake lights), the braking system, the transmission, fuel delivery systems, and/or other mechanical systems. The mechanical systems of vehicle 12 may include one or more mechanical sensors, electronic sensors, and/or other sensors that generate the output signals (e.g., seat belt sensors, tire pressure sensors, etc.). In some implementations, at least one of sensors 18 may be a vehicle system sensor included in an ECM system of vehicle 12.

Information related to the operation and/or context of vehicle 12 may include information related to the environment in and/or around vehicle 12. The vehicle environment may include spaces in and around an interior and an exterior of vehicle 12. The information related to the operation and/or context of vehicle 12 may include information related to movement of vehicle 12, an orientation of vehicle 12, a geographic position of vehicle 12, a spatial position of vehicle 12 relative to other objects, a tilt angle of vehicle 12, an inclination/declination angle of vehicle 12, and/or other information. In some implementations, the output signals conveying the information related to the operation and/or context of vehicle 12 may be generated via non-standard aftermarket sensors installed in vehicle 12. The non-standard aftermarket sensor may include, for example, a microphone, an accelerometer, a gyroscope, a geolocation sensor (e.g., a GPS device), a radar detector, a magnetometer, radar (e.g. for measuring distance of leading vehicle), and/or other sensors.

Although sensors 18 are depicted in FIG. 1 as a single element, this is not intended to be limiting. Sensors 18 may include one or more sensors located adjacent to and/or in communication with the various mechanical systems of vehicle 12, in one or more positions (e.g., at or near the front of vehicle 12) to accurately acquire information representing the vehicle environment (e.g. spatial information, orientation information), and/or in other locations. For example, in some implementations, system 10 may be configured such that a first sensor is located near/in communication with a rotating tire of vehicle 12, and a second sensor located on top of vehicle 12 is in communication with a geolocation satellite. In some implementations, sensors 18 are configured to generate output signals continuously during operation of vehicle 12.

Control unit 20 may be configured to transmit vehicle event information to computing device 100 over a network. Control unit 20 may be coupled with vehicle 12. Control unit 20 may be configured to transmit the vehicle event information via communication device 14 and/or without communication device 14. Control unit 20 may be configured to receive vehicle operation information via output signals generated by sensors 18 and detect vehicle events based on the output signals. For example, events may be detected as described in U.S. patent application Ser. No. 14/186,416, filed Feb. 21, 2014, and incorporated herein by reference. The vehicle event information may include vehicle operation information that corresponds to the detected vehicle events. In some implementations, control unit 20 may be configured such that the detected vehicle events have individual start times and individual end times, and the vehicle event information includes vehicle operation information for periods of time that last from before and/or about the individual start times until about and/or after the individual end times. For example, the detected vehicle events may include a first vehicle event that has a first start time and a first end time, and the vehicle event information for the first vehicle event includes vehicle operation information for a period of time that lasts from before and/or about the first start time until about and/or after the first end time.

In some implementations, control unit 20 may be configured such that detecting vehicle events includes determining one or more vehicle parameters of vehicle 12. Control unit 20 may determine the vehicle parameters based on the information conveyed by the output signals from sensors 18, information provided by external systems and/or databases, and/or other information. The one or more vehicle parameters may be related to the operation of vehicle 12, the context of vehicle 12, and/or other information. For example, the one or more vehicle parameters may be related to one or more of an acceleration, a direction of travel, a turn diameter, a vehicle speed, an engine speed (e.g. RPM), a duration of time, a closing distance, a lane departure from an intended travelling lane of the vehicle, a following distance, physical characteristics of vehicle 12 (such as mass and/or number of axles, for example), a tilt angle of vehicle 12, an inclination/declination angle of vehicle 12, whether or not brakes are being applied, a number of times a specific vehicle control system (e.g., the brakes) is activated, a temperature, fuel use, and/or other parameters. In some implementations, control unit 20 may be configured to determine one or more of the vehicle parameters one or more times in an ongoing manner during operation of vehicle 12. In some implementations, control unit 20 may be configured to determine one or more of the vehicle parameters at regular time intervals during operation of vehicle 12. The timing of the vehicle parameter determinations (e.g., in an ongoing manner, at regular time intervals, etc.) may be programmed at manufacture, obtained responsive to user entry and/or selection of timing information via user interface 22 and/or 132, and/or may be determined in other ways.

In some implementations, control unit 20 may be configured such that detecting vehicle events includes obtaining one or more pre-determined vehicle event criteria sets. The pre-determined vehicle event criteria sets may describe individual vehicle events (e.g., such as the first vehicle event described in the example above). The pre-determined vehicle event criteria sets may be programmed at manufacture, obtained by control unit 20 responsive to user entry and/or selection of information related to pre-determined vehicle event criteria sets via user interface 22 and/or 132, obtained from electronic storage 24 and/or 134, and/or may be obtained in other ways. In some implementations, the pre-determined vehicle event criteria sets may be received from external computing systems such as computing device 100 and/or other computing systems.

In some implementations, control unit 20 may be configured such that detecting vehicle events includes detecting vehicle events in real-time or near real-time. Control unit 20 may be configured to detect execution of a specific vehicle event based on the information conveyed by the output signals generated by sensors 18, the vehicle parameters, the pre-determined criteria sets, and/or based on other information. A specific vehicle event may be detected based on the determined vehicle parameters and the obtained pre-determined vehicle event criteria sets by comparing the determined vehicle parameters to the criteria sets. For example, the first vehicle event may be detected responsive to the determined parameters satisfying one or more individual criteria in a first criteria set associated with the first vehicle event. By way of a non-limiting example, control unit 20 may determine that a vehicle operator has tapped his brakes more than X times (e.g., no single trigger) in Y time frame (thus satisfying multiple individual brake tapping criteria as well as a time frame criterion) and trigger a vehicle event because the driver may be drowsy and/or nodding off.

In some implementations, control unit 20 may be mounted to and/or otherwise coupled with vehicle 12. In some implementations, control unit 20 may be and/or include an ECM coupled with operational systems of vehicle 12 such as vehicle sensors (e.g., included in sensors 18), vehicle communication systems (e.g., included in communication device 14), vehicle camera systems (e.g., included in video system 16), and/or other vehicle systems. In some implementations, control unit 20 may include and/or be coupled with a vehicle user interface 22, vehicle electronic storage 24, and/or other components. In some implementations, control unit 20 may include and/or be coupled with an audible alarm. In some implementations, control unit 20 may be operatively coupled with vehicle control systems such as the engine and/or brakes, communication device 14, video system 16, and/or other devices. In some implementations, control unit 20 may be configured to operate based on predetermined and/or preprogrammed algorithms and/or other information stored in electronic storage 24 and/or in other locations. The preprogrammed algorithms and/or other information may cause control unit 20 to function as described herein and/or to perform other functions such as determining and/or generating information related to an operator score, generating alerts and/or other operator feedback (e.g., presented to the operator via user interface 22), and/or performing other functions based on the predetermined algorithms and/or other information stored in electronic storage 24, for example. In some implementations, control unit 20 may be configured to initiate changes in vehicle control systems (e.g., such as reducing engine power and/or applying brakes, turning on/off other systems that should/should not be used while a condition (event) that control unit 20 has detected/determined is ongoing), turn on/off feedback to drivers via a vehicle user interface (e.g., user interface 22) and/or audible alerts, send information to be stored for future evaluation, cause the video system 16 and/or other in-vehicle systems to perform one or more specified functions, facilitate transmission of information via communication device 14 to computing device 100 and/or other computing devices, machines, and/or vehicles, and/or perform other activities.

Video system 16 may be configured to acquire video information representing a vehicle environment. The video information may include visual information from an environment about vehicle 12, information related to an individual device that captures the video information, and/or other information. The vehicle environment may include spaces in and/or around a vehicle. In some implementations, video system 16 may be configured to store the acquired video information locally in electronic memory associated with video system 16, transmit the acquired video information to computing device 100 via communication device 14, transmit the acquired video information directly to computing device 100 (e.g., by directly communicating with computing device 100 via a network), and/or process the acquired video information in other ways. In some implementations, video system 16 may be configured to transmit, over the network, video information captured during periods of time for the detected vehicle events. Video system 16 may be configured such that the video information includes video information for periods of time that last from before and/or about the individual start times of the detected vehicle events until about and/or after the individual end times of the detected vehicle events. Continuing with the example above, the periods of time may include video information for a first period of time for the first vehicle event that lasts from before and/or about the individual start time of the first detected vehicle event until about and/or after the end time of the first vehicle event.

Video system 16 may be configured such that the video information captured during the periods of time for the vehicle events is transmitted to computing device 100 via communication device 14 or without communication device 14 (e.g., directly to computing device 100) separate from the vehicle event information (described above), such that the video information captured during the first period of time is transmitted separate from the vehicle event information for the first vehicle event, for example.

In some implementations, control unit 20 may be configured to, responsive to detecting individual vehicle events, cause video system 16 to transmit video information for periods of time that correspond to the detected vehicle events to computing device 100. The control unit may, for example, communicate locally with video system 16 (e.g. via the vehicle network, Ethernet, Bluetooth, etc.) and/or indirectly through a backend service that is in communication with both control unit 20 and video system. 16. In some implementations, control unit 20 may be configured to cause video system 16 to designate which frames of visual information are associated with the individual periods of time that correspond to the individual vehicle events and cause video system 16 to separately (from the vehicle event information) transmit the designated visual information to computing device 100. In some implementations, control unit 20 may be configured to cause video system 16 to designate a first set of frames of visual information that includes frames for a period of time that lasts from before the start time until after the end time of and individual vehicle event, and a second set of frames of visual information that includes frames for a period of time that lasts from the start time until the end time of the individual vehicle event. These implementations are not intended to be limiting. Control unit 20 may cause video system 16 to designate any frames for transmission that are relevant to an individual vehicle event.

In some implementations, control unit 20 may communicate locally (e.g., within vehicle 12) with video system 16. Control unit 20 may, for example, generate a globally-unique UI (GUID) that identifies the vehicle event, and transmit the GUID along with pre-duration (seconds) and post-duration (seconds) parameters to video system 16. In response, video system 16 may transmit (and/or queue for transmission) a segment of video information that is identified by the GUID and/or represents the segment of time that is bounded by pre-duration and post-duration parameters as they are applied at the point in time that video system 16 received such a message from control unit 20. For example, if the message is received at 5:25:20 PM (per a video system clock) and pre-duration is set to 12 seconds and post-duration is set to 20 seconds, video system 16 may transmit a segment of video information that corresponds to a 5:25:08 PM, 5:25:40 PM interval. A slight difference in local clocks (seconds or milliseconds) between control unit 20 and video system 16 is accounted for as described herein (e.g., analysis, synchronization, etc.). For example, the GUID may also be part of vehicle event record 200. To the extent that the latency of local message transmission is small and to the extent that video system 16 responds to the local message (from control unit 20) relatively quickly, the alignment of the two datasets will be an easier task, but this is not guaranteed (e.g., synchronization step 310 described below may be helpful, but not always necessary).

By way of a non-limiting example, FIG. 2A illustrates separate transmission of vehicle event information 200 and video information 202 via the network to computing device 100. Computing device 100 generates a single synchronized electronic vehicle event record 204 based on separately transmitted vehicle event information 200 and video information 202 (described further below). In this example, control unit 20 has transmitted vehicle event information 200 via communication device 14 and video system 16 has transmitted video information 202 also via communication device 14. But this is not intended to be limiting. As described herein, the transmission of vehicle event information 200 and/or video information 202 made be made directly from control unit 20 and/or video system 16 without the use of communication device 14. In addition, the separate transmissions of vehicle event information 200 and video information 202 may be made substantially simultaneously and/or at different times. For example, control unit 20 may detect a vehicle event and transmit vehicle event information 200, and then video system 16 may transmit video information 202 that corresponds to the same vehicle event. In this example implementation, control unit 20 may, responsive to detecting the vehicle event, cause video system 16 to transmit video information for a period of time that corresponds to the detected vehicle event to computing device 100 such that the transmission from video system 16 happens after the transmission from control unit 20. In some implementations, video system 16 may be instructed to transmit video information for a period of time by computing device 100. This would in turn be in response to computing device 100 receiving vehicle event information and computing device 100 being aware that control unit 20 is not able to transmit local (within vehicle) messages to video system 16. In such cases, computing device 100 may send a remote message to video system 16 to generate and transmit video information that corresponds in time to the vehicle event. (This presumes that video system 16 retains information for an extended period of time (minutes and hours if not days), which is the case with most DVR solutions on the market.)

By way of a second non-limiting example, FIG. 2B uses a timeline 252 to illustrate detection of a vehicle event 250 and subsequent transmission of vehicle event information 200 and video information 202 to computing device 100. As shown in FIG. 2B, sensors 18 generate output signals 254 conveying information related to the operation of vehicle 12 (shown in FIG. 1). Control unit 20 detects vehicle event 250 based on the output signals and/or other information as described herein and provides an indication 256 of the vehicle event to video system 16. Control unit 20 then generates vehicle event information 200 that corresponds to vehicle event 250 and transmits 258 vehicle event information 200 to computing device 100. Responsive to receiving indication 256 from control unit 20, video system 16 generates and/or designates (as described above) video information 202 and then transmits 260 video information 202 to computing device 100. Computing device 100 then generates single synchronized electronic vehicle event record 204 based on separately transmitted vehicle event information 200 and video information 202 (described further below).

Returning to FIG. 1, video system 16 may include systems for compiling and/or collecting video information, for example, video cameras, digital cameras, analog cameras, still cameras, infrared sensors, a VCR, a DVR, non-transitory electronic memory, and/or other video capture devices that acquire visual information. In some implementations, video system 16 may include vehicle system-integrated video capture devices (e.g., devices such as a back-up camera installed in vehicle 12 by the vehicle manufacturer), non-system integrated video capture devices (e.g., third party and/or aftermarket systems installed in vehicle 12), and/or other video capture devices. In some implementations, video system 16 may include video recording devices such as smart phone cameras and/or other devices not physically coupled to the vehicle and/or control unit 20, for example. Such devices may communicate wirelessly with control unit 20, communication device 14, computing device 100, and/or other components of system 10, for example. The visual information may include videos, images, clips, broadcasts, pictures, visual data and/or other visual information representing the vehicle environment. In some implementations, the visual information may include visual information that provides information related to a vehicle's speed, location, heading, and/or other vehicle information. In some implementations, video system 16 may include multiple video capture devices positioned in and/or around and/or otherwise coupled with vehicle 12. In some implementations, these video capture devices may be synchronized together to provide a single coordinated view of the inside and/or the outside of vehicle 12. In some implementations, the video information captured from multiple video capture devices may not be synchronized. In such implementations, the video information may be transmitted to computing device 100, for example, where it may be synchronized with other video and/or non-video data to create video event records (e.g., as described herein).

Although video system 16 is depicted in FIG. 1 as a single element coupled with vehicle 12, this is not intended to be limiting. Video system 16 may include one or more video capture devices located on the interior of vehicle 12, the exterior of vehicle 12, and/or in any location that facilitates communication with communication device 14, control unit 20, computing device 100, and/or other components of system 10.

Computing device 100 may include one or more physical computer processors 120, a user interface 132, electronic storage 134, and/or other components. Computing device 100 may be located remotely from vehicle 12. Computing device 100 may be configured to enable a user to interface with system 10 (e.g., via user interface 132), and/or provide other functionality attributed herein to computing device 100. Computing device 100 may be configured to communicate with communication device 14, control unit 20, video system 16, sensors 18, and/or other components of system 10 that are coupled with vehicle 12 via a network such as the internet, cellular network, Wi-Fi network, Ethernet, and/or other interconnected computer networks. Computing device 100 may facilitate viewing and/or analysis of the information conveyed by the output signals of sensors 18, the information determined by control unit 20, the information recorded by video system 16, the information communicated by communication device 14, and/or other information. By way of non-limiting example, remote computing device 100 may include one or more of a server, a server cluster, desktop computer, a laptop computer, a handheld computer, a tablet computing platform, a NetBook, a Smartphone, a gaming console, and/or other computing platforms.

As described above, in some implementations, computing device 100 may be and/or include a server. The server may include communication lines, or ports to enable the exchange of information with a network, communication device 14, video system 16, sensors 18, control unit 20, and/or other computing platforms. The server may include a plurality of processors, electronic storage, hardware, software, and/or firmware components operating together to provide the functionality attributed herein to computing device 100. For example, the server may be implemented by a cloud of computing platforms operating together as a system server.

Processor 120 may be configured to provide information processing capabilities in computing device 100 and/or system 10 in general. As such, processor 120 may comprise one or more of a digital processor, an analog processor, a digital circuit designed to process information, an analog circuit designed to process information, a state machine, and/or other mechanisms for electronically processing information. Although processor 120 is shown in FIG. 1 as a single entity, this is for illustrative purposes only. In some implementations, processor 120 may comprise a plurality of processing units. These processing units may be physically located within the same device (e.g., computing device 100), or processor 120 may represent processing functionality of a plurality of devices operating in coordination.

As shown in FIG. 1, processor 120 may be configured to execute one or more computer program components. The computer program components may comprise one or more of a communication component 122, an analysis component 124, an event record component 126, a synchronization component 128, and/or other components. Processor 120 may be configured to execute components 122, 124, 126, and/or 128 by software; hardware; firmware; some combination of software, hardware, and/or firmware; and/or other mechanisms for configuring processing capabilities on processor 120. It should be appreciated that although components 122, 124, 126, and 128 are illustrated in FIG. 1 as being co-located within a single processing unit, in implementations in which processor 120 comprises multiple processing units, one or more of components 122, 124, 126, and/or 128 may be located remotely from the other components. The description of the functionality provided by the different components 122, 124, 126, and/or 128 described herein is for illustrative purposes, and is not intended to be limiting, as any of components 122, 124, 126, and/or 128 may provide more or less functionality than is described. For example, one or more of components 122, 124, 126, and/or 128 may be eliminated, and some or all of its functionality may be provided by other components 122, 124, 126, and/or 128. As another example, processor 120 may be configured to execute one or more additional components that may perform some or all of the functionality attributed below to one of components 122, 124, 126, and/or 128.

In some implementations, computing device 100 (e.g., by way of communication component 122, analysis component 124, event record component 126, and/or synchronization component 128) is configured to "marry" the transmitted vehicle event information and the video information to generate a synchronized electronic vehicle event record for a corresponding vehicle event. As described herein, in some implementations, this generating is performed remotely from vehicle 12.

Communication component 122 may be configured to receive, over the network, the vehicle event information transmitted from control unit 20, and separately, the video information transmitted from video system 16 captured during periods of time for the detected vehicle events. Continuing with the example above, the video information captured during the first period of time (that corresponds to the first vehicle event) is received separate from the vehicle event information for the first vehicle event, for example.

Analysis component 124 may be configured to analyze the received vehicle event information and the received video information. Based on such analysis, analysis component 124 may be configured to correlate vehicle event information for the detected vehicle events with received video information captured during the periods of time for the detected vehicle events. Analysis component 124 may be configured to correlate vehicle event information for the detected vehicle events with received video information captured during the periods of time for the detected vehicle events such that the video information captured during the first period of time is correlated with the vehicle event information for the first vehicle event, for example. In some implementations, correlation may be performed based on the GUID (described above), timestamps captured by video system 16 and/or control unit 20, and/or other information.

Event record component 126 may be configured to generate event records that include and/or identify the video information captured during the periods of time for the detected vehicle events and the vehicle event information for the detected vehicle events. Event record component 126 may be configured such that the event records include a first event record for the first vehicle event, for example. The first event record may include and/or identify the video information captured during the first period of time and the vehicle event information for the first vehicle event.

Synchronization component 128 may be configured to synchronize the vehicle event information and the video information. Synchronization component 128 may be configured to synchronize the vehicle event information and the video information by identifying and correlating corresponding phenomena in the vehicle event information and the video information during the vehicle event. For example, synchronization component 128 may be configured to observe that vehicle speed (from a GPS, a wheel sensor, and/or other sensors) returns to zero (e.g. the vehicle stops) and correlate this to the point at which the difference between consecutive video frames becomes minimal, indicating visually that the vehicle has stopped. Synchronization component 128 may be configured to synchronize the vehicle event information and the video information such that the video information captured during the first period of time is synchronized with the vehicle event information for the first vehicle event, for example.

In some implementations, synchronization component 128 may be configured such that identifying and correlating corresponding phenomena in the vehicle event information and the video information includes identifying and correlating one or more of time information (e.g., a time of day and/or other time stamp determined by control unit 20) associated with the vehicle event information for an individual vehicle event and time information (e.g., a time of day and/or other time stamp determined by video system 16) associated with the video information captured during the period of time that corresponds to the individual vehicle event. In some implementations, synchronization component 128 may be configured such that identifying and correlating corresponding phenomena in the vehicle event information and the video information includes identifying and correlating information indicative of a physical event conveyed by the output signals included in the vehicle event information for an individual vehicle event and information indicative of the same physical event conveyed by the video information captured during the period of time that corresponds to the individual vehicle event.

In some implementations, synchronization may be based on geographical location of a vehicle and/or other keys. By way of non-limiting example, a vehicle's location may be determined and/or recorded at the start of a video data stream. Data in the video data stream may be recorded at some frequency (e.g., x number of data points per second). The vehicle's location may also be recorded in a vehicle data stream at some other frequency (e.g., y data points per second). Synchronization component 128 may then use the vehicle's location to determine where to start synchronizing data from the video stream and the vehicle data stream and align data in different streams based on the frequency information.

In some implementations, responsive to synchronization by synchronization component 128, communication component 122 may be configured to facilitate review of the synchronized event record by a reviewer. The reviewer may be remotely located from vehicle 12 and/or computing device 100, in a review center for example, viewing the synchronized event records in real-time and/or at a later time. The remote reviewer may score operators, provide feedback to operators, develop coaching plans, and/or take other actions based on reviews of synchronized event records, for example.

User interface 22 (coupled with vehicle 12) and/or user interface 132 (included in computing device 100 may be configured to provide an interface between system 10 and users through which the users may provide information to and receive information from system 10. This enables predetermined profiles, criteria, data, cues, results, instructions, and/or any other communicable items, collectively referred to as "information," to be communicated between a user and one or more of vehicle 12, communication device 14, video system 16, sensors 18, control unit 20, computing device 100, and/or other components of system 10. By way of a non-limiting example, a user may enter, select, and/or upload predetermined vehicle event criteria using user interface 22 and/or user interface 132.

Examples of interface devices suitable for inclusion in user interface 22 and/or user interface 132 comprise a keypad, buttons, switches, a keyboard, knobs, levers, a display screen, a touch screen, speakers, a microphone, an indicator light, an audible alarm, a printer, a tactile feedback device, and/or other interface devices. In one implementation, user interface 22 and/or user interface 132 comprises a plurality of separate interfaces. In one implementation, user interface 22 comprises at least one interface that is provided integrally with control unit 20.

It is to be understood that other communication techniques, either hard-wired or wireless, are also contemplated by the present disclosure as user interface 22 and/or user interface 132. In some implementations, user interface 22 and/or user interface 132 may be included in a removable storage interface provided by electronic storage 24 (e.g., in control unit 20) and/or electronic storage 134 (e.g., in computing device 100). In these examples, information may be loaded into system 10 wirelessly from a remote location, from removable storage (e.g., a smart card, a flash drive, a removable disk, etc.), and/or other sources that enable the user(s) to customize the implementation of system 10. Other exemplary input devices and techniques adapted for use with system 10 as user interface 22 and/or user interface 132 comprise, but are not limited to, an RS-232 port, RF link, an IR link, modem (telephone, cable, and/or other modems), a cellular network, a Wi-Fi network, a local area network, and/or other devices and/or systems. In short, any technique for communicating information with system 10 is contemplated by the present disclosure as user interface 22 and/or user interface 132.

Electronic storage 24 (coupled with vehicle 12) and/or electronic storage 134 (included in computing device 100) may comprise electronic storage media that electronically stores information. The electronic storage media of electronic storage 24 and/or electronic storage 134 may comprise one or both of system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 24 and/or 134 may comprise one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 24 and/or 134 may store software algorithms (e.g., vehicle event detection algorithms), recorded video event data, information determined by control unit 20 and/or processor 120, information received via user interfaces 22 and/or 132, and/or other information that enables system 10 to function properly. Electronic storage 24 and/or 134 may be (in whole or in part) a separate component within system 10, or electronic storage 24 and/or 134 may be provided (in whole or in part) integrally with one or more other components of system 10 (e.g., control unit 20, processor 120, etc.).

Figure 3:
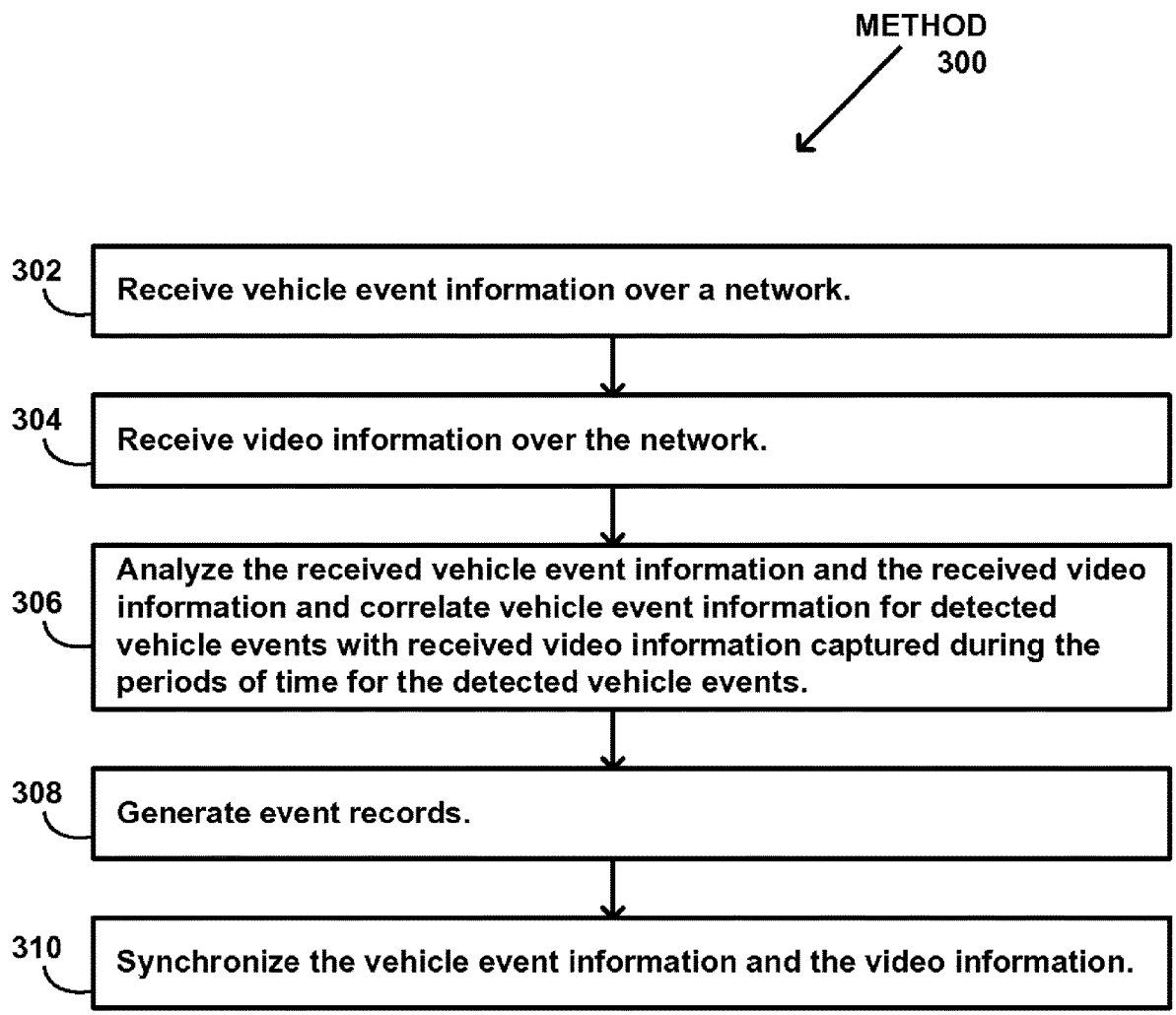
FIG. 3 illustrates a method for generating a synchronized electronic vehicle event record.
Figure 4:
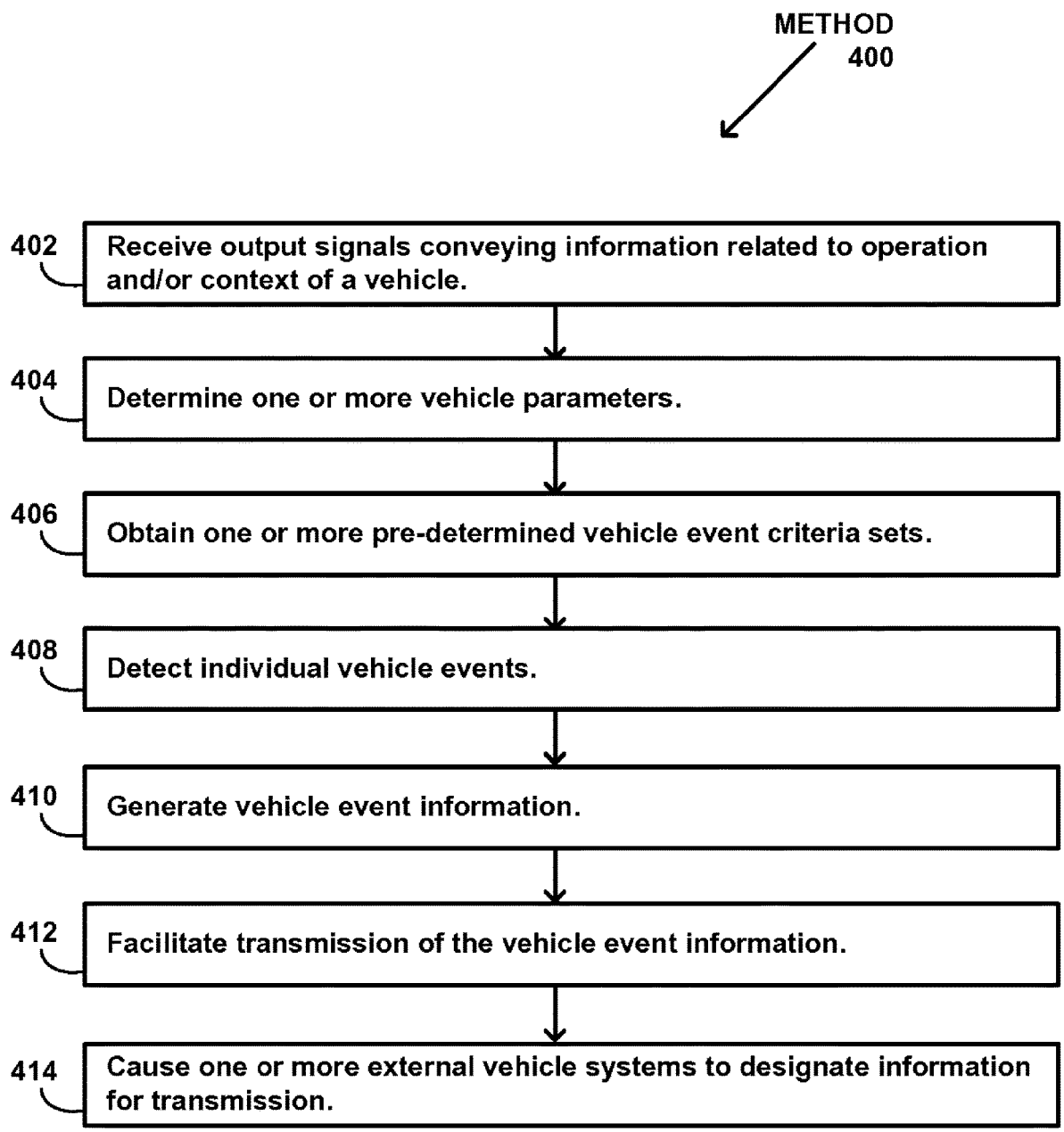
FIG. 4 illustrates a method for detecting vehicle events with a detection system that is coupled to a vehicle and transmitting vehicle event information to a remotely located computing device.

FIG. 3 illustrates a method 300 for generating a synchronized electronic vehicle event record. FIG. 4 illustrates a method 400 for detecting vehicle events with a detection system (which may be coupled to the vehicle) and transmitting vehicle event information to a remotely located computing device. The operations of method 300 and/or 400 presented below are intended to be illustrative. In some implementations, method 300 and/or 400 may be accomplished with one or more additional operations not described, and/or without one or more of the operations discussed. Additionally, the order in which the operations of method 300 and/or 400 are illustrated (in FIG. 3 and FIG. 4) and described below is not intended to be limiting. In some implementations, two or more of the operations may occur substantially simultaneously.

In some implementations, method 300 and/or 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 and/or 400 in response to instructions stored electronically on one or more electronic storage mediums. The one or more processing devices may include one or more devices configured through hardware, firmware, and/or software to be specifically designed for execution of one or more of the operations of method 300 and/or 400.

Referring to FIG. 3 and method 300, at an operation 302, vehicle event information may be received over a network. The vehicle event information may be transmitted from a control unit mounted to a vehicle. The control unit may be configured to (i) receive vehicle operation information via output signals generated by sensors coupled with the vehicle, and (ii) detect vehicle events based on the output signals. The vehicle event information may include vehicle operation information that corresponds to the detected vehicle events. The detected vehicle events may include a first vehicle event, for example. In some implementations, the control unit may be configured such that the detected vehicle events have individual start times and individual end times, and the vehicle event information includes vehicle operation information for periods of time that last from before the individual start times until after the individual end times. In some implementations, operation 302 may be performed by one or more physical computer processor components the same as or similar to communication component 122 (shown in FIG. 1 and described herein).

At an operation 304, video information may be received over the network. The video information may be transmitted from a video system mounted to the vehicle. The video information may be captured during periods of time for the detected vehicle events. In some implementations, the video system is configured such that the video information includes video information for periods of time that last from before the individual start times until after the individual end times of vehicle events. The periods of time may include a first period of time for the first vehicle event, for example. The video information may include consecutive frames of visual information representing an environment about the vehicle. The video system may be physically separate and distinct from the control unit. The video information may be transmitted separate from the vehicle event information such that the video information captured during the first period of time is transmitted separate from the vehicle event information for the first vehicle event. In some implementations, the control unit may cause the transmission of the video information responsive to detection of a vehicle event. In some implementations, operation 304 may be performed by one or more physical computer processor components the same as or similar to communication component 122 (shown in FIG. 1 and described herein).

At an operation 306, the received vehicle event information and the received video information may be analyzed and correlated. The correlation may be based on the analysis. The vehicle event information for detected vehicle events may be correlated with received video information captured during the periods of time for the detected vehicle events. The video information captured during the first period of time may be correlated with the vehicle event information for the first vehicle event, for example. In some implementations, operation 306 may be performed by one or more physical computer processor components the same as or similar to analysis component 124 (shown in FIG. 1 and described herein).

At an operation 308, event records may be generated. The generated event records may include and/or identify the video information captured during the periods of time for the detected vehicle events and the vehicle event information for the detected vehicle events. The event records may include a first event record for the first event, for example. The first event record may include and/or identify the video information captured during the first period of time and the vehicle event information for the first vehicle event, for example. In some implementations, operation 308 may be performed by one or more physical computer processor components the same as or similar to event record component 126 (shown in FIG. 1 and described herein).

At an operation 310, the vehicle event information and the video information may be synchronized. Synchronizing the vehicle event information and the video information may include identifying and correlating corresponding phenomena in the vehicle event information and the video information during the vehicle event such that the video information captured during the first period of time is synchronized with the vehicle event information for the first vehicle event, for example. Identifying and correlating corresponding phenomena in the vehicle event information and the video information may include identifying and correlating one or more of first time information associated with the vehicle event information for the first vehicle event and second time information associated with the video information captured during the first period of time; or information indicative of a physical event conveyed by the output signals included in the vehicle event information for the first vehicle event and information indicative of the same physical event conveyed by the video information captured during the first period of time. In some implementations, operation 310 may be performed by one or more physical computer processor components the same as or similar to synchronization component 128 (shown in FIG. 1 and described herein).

Referring to FIG. 4 and method 400, at an operation 402, output signals conveying information related to the operation of a vehicle, the context of the vehicle, and/or other information may be received. Operation 402 may include receiving output signals conveying information related to one or more of mechanical systems of the vehicle, movement of the vehicle, an orientation of the vehicle, a geographic position of the vehicle, a spatial position of the vehicle relative to other objects, and/or other operational/contextual characteristics of the vehicle. In some implementations, operation 402 may be performed by a control unit the same as or similar to control unit 20 (shown in FIG. 1 and described herein).

At an operation 404, one or more vehicle parameters may be determined. The one or more vehicle parameters may be determined based on the output signals and/or other information. The one or more vehicle parameters may be related to the operation of the vehicle, the context of the vehicle, and/or other vehicle parameters. In some implementations, the one or more vehicle parameters may be determined one or more times in an ongoing manner during operation of the vehicle. In some implementations, operation 404 may be performed by a control unit the same as or similar to control unit 20 (shown in FIG. 1 and described herein).

At an operation 406, one or more pre-determined vehicle event criteria sets may be obtained. The one or more pre-determined vehicle event criteria sets may include criteria sets associated with individual vehicle events. The one or more pre-determined criteria sets may include a first pre-determined criteria set for a first vehicle event, for example. The first criteria set may include a first individual criterion and a second individual criterion. In some implementations, the first individual criterion and the second individual criterion for the first pre-determined criteria set may be associated with information conveyed by output signals from at least two different sensors. In some implementations, operation 406 may be performed by a control unit the same as or similar to control unit 20 (shown in FIG. 1 and described herein).

At an operation 408, individual vehicle events may be detected. The detection may be based on the vehicle parameters and the pre-determined criteria sets. Vehicle events may be detected by comparing the determined vehicle parameters to the criteria sets such that, for example, the first vehicle event is detected responsive to the determined parameters satisfying the first individual criterion and the second individual criterion. In some implementations, operation 408 may be performed by a control unit the same as or similar to control unit 20 (shown in FIG. 1 and described herein).

At an operation 410, vehicle event information may be generated. The vehicle event information may include vehicle operation and/or context information for periods of time that correspond to the detected vehicle events. In some implementations, operation 410 may be performed by a control unit the same as or similar to control unit 20 (shown in FIG. 1 and described herein).

At an operation 412, transmission of the vehicle event information may be facilitated. In some implementations, operation 412 may include transmission of vehicle event information that corresponds to the detected vehicle events to a remotely located computing device. In some implementations, operation 412 may be performed by a control unit the same as or similar to control unit 20 (shown in FIG. 1 and described herein).

At an operation 414, one or more external vehicle systems may be caused to designate information for transmission. In some implementations, operation 414 includes causing one or more external vehicle systems that generate information about the vehicle to designate information associated with periods of time that correspond to the detected vehicle events for transmission to the remotely located computing device. In some implementations, the one or more external vehicle systems include a video system that is caused to designate which frames of visual information are associated with the periods of time that correspond to the vehicle events and transmit the designated visual information to the remotely located computing device. In some implementations, operation 412 may be performed by a control unit the same as or similar to control unit 20 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to generate vehicle event records for a fleet of vehicles, wherein the fleet of vehicles includes a first vehicle and a second vehicle, the system comprising:
    a centralized cloud server including one or more physical computer processors located remotely from both the first and the second vehicle, the one or more physical computer processors being configured by computer readable instructions to:
    receive, over a network during a first transmission, vehicle event information from a control unit mounted to the first vehicle, wherein the vehicle event information indicates vehicle speed of the first vehicle returning to zero, the control unit being configured to i) receive vehicle operation information via output signals generated by sensors coupled with the first vehicle, and
ii) detect vehicle events based on the output signals, wherein the vehicle event information includes vehicle operation information and first time information that correspond to the detected vehicle events, wherein the detected vehicle events include a first vehicle event, wherein the vehicle event information for the first vehicle event is associated with the first time information;

receive, over the network during a second transmission, video information corresponding to the first vehicle event from a video system, the second transmission being separate from the first transmission, wherein the video information includes different information than the vehicle event information, wherein the video information indicates that differences between consecutive frames of visual information outside of the first vehicle have become minimal, the video system including a video camera, the video system being mounted to the first vehicle and being physically separate and distinct from the control unit, wherein the video camera is an aftermarket camera, wherein the video information has been captured during periods of time for the detected vehicle events, the periods of time including a first period of time for the first vehicle event, the video information including second time information and consecutive frames of visual information representing an environment about the first vehicle, wherein the video information for the first vehicle event is associated with the second time information;

analyze the vehicle event information received during the first transmission to identify information indicative of a physical event conveyed by the output signals, wherein the physical event occurred in the first period of time;

analyze the video information received during the second transmission to identify information indicative of the same physical event;

correlate, by the one or more physical computer processors, the vehicle event information received during the first transmission with the video information received during the second transmission based on the analysis of both the vehicle event information and the video information such that the correlating is performed at a location that is remote from the first vehicle, wherein correlating the vehicle event information with the video information includes correlating the first time information and the second time information; and generate a first event record that includes or identifies i) the video information that corresponds to the first vehicle event and ii) the vehicle event information for the first vehicle event.

2. The system of claim 1, wherein the first vehicle event is an accident.

3. The system of claim 1, wherein the one or more physical computer processors are configured such that the correlating of the vehicle event information with the video information includes identifying and correlating:
information indicative of the physical event conveyed by the output signals included in the vehicle event information for the first vehicle event and information indicative of the same physical event conveyed by the video information captured during the first period of time.

4. The system of claim 1, wherein the control unit is configured such that:
the detected vehicle events have individual start times and individual end times, and
the vehicle event information includes vehicle operation information for periods of time that last from before the individual start times until after the individual end times; and
wherein the video system is configured such that the video information includes video information for periods of time that last from before the individual start times until after the individual end times.

5. The system of claim 1, wherein the video system is included in one or more external vehicle systems that generate information about the first vehicle.

6. The system of claim 1, wherein the one or more physical computer processors are further configured by computer readable instructions to:
responsive to receiving the vehicle event information, send a message from the centralized cloud server to the video system, wherein the message requests that the video system transmits the video information to the centralized cloud server, wherein the video information corresponds to the first vehicle event.

7. The system of claim 6, wherein the video information is received over the network responsive to the message.

8. The system of claim 1, wherein the first vehicle includes one or more of an automobile, a truck, a delivery vehicle, a plane, or a train.

9. A method for generating vehicle event records for a fleet of vehicles, wherein the fleet of vehicles includes a first vehicle and a second vehicle, the method comprising:
receiving, by a centralized cloud server that is geographically separated from the first vehicle and the second vehicle, and over a network during a first transmission, vehicle event information from a control unit mounted to the first vehicle, wherein the vehicle event information indicates vehicle speed of the first vehicle returning to zero, wherein the control unit:
i) receives vehicle operation information via output signals generated by sensors coupled with the first vehicle, and
ii) detects vehicle events based on the output signals, wherein the vehicle event information includes including vehicle operation information and first time information that correspond to the detected vehicle events, wherein the detected vehicle events including a first vehicle event, wherein the vehicle event information for the first vehicle event is associated with the first time information;
receiving, over the network during a second transmission, video information corresponding to the first vehicle event from a video system, the second transmission being separate from the first transmission, wherein the video information includes different information than the vehicle event information, wherein the video information indicates that differences between consecutive frames of visual information outside of the first vehicle have become minimal, the video system including a video camera, the video system being mounted to the first vehicle and being physically separate and distinct from the control unit, wherein the video camera is an aftermarket camera, the video information being transmitted from the vehicle separately from the vehicle event information, wherein the video information has been captured during periods of time for the detected vehicle events, the periods of time including a first period of time for the first vehicle event, the video information including second time information and consecutive frames of visual information representing an environment about the first vehicle, wherein the video information for the first vehicle event is associated with the second time information;

analyzing the vehicle event information received during the first transmission to identify information indicative of a physical event conveyed by the output signals, wherein the physical event occurred in the first period of time;

analyzing the video information received during the second transmission to identify information indicative of the same physical event;

correlating, by one or more physical computer processors, the vehicle event information received during the first transmission with the video information received during the second transmission, wherein the correlating is based on analyzing both the vehicle event information and the video information such that the correlating is performed at a location that is remote from the first vehicle, wherein the correlating of the vehicle event information with the video information includes correlating the first time information and the second time information; and generating a first event record that includes or identifies i) the video information that corresponds to the first vehicle event and ii) the vehicle event information for the first vehicle event.

10. The method of claim 9, wherein the first vehicle event is an accident.

11. The method of claim 9, wherein correlating the vehicle event information with the video information includes identifying and correlating:

information indicative of the physical event conveyed by the output signals included in the vehicle event information for the first vehicle event and information indicative of the same physical event conveyed by the video information captured during the first period of time.

12. The method of claim 9, wherein the control unit is configured such that:

the detected vehicle events have individual start times and individual end times, and the vehicle event information includes vehicle operation information for periods of time that last from before the individual start times until after the individual end times; and wherein the video system is configured such that the video information includes video information for periods of time that last from before the individual start times until after the individual end times.

13. The method of claim 9, wherein the video system is included in one or more external vehicle systems that generate information about the first vehicle.

14. The method of claim 9, further comprising:

responsive to receiving the vehicle event information, send a message from the to the centralized cloud server to the video system, wherein the message requests that the video system transmits the video information to the centralized cloud server, wherein the video information corresponds to the first vehicle event.

15. The method of claim 14, wherein the video information is received over the network responsive to the message.

16. The method of claim 9, wherein the first vehicle includes one or more of an automobile, a truck, a delivery vehicle, a plane, or a train.

* * * * *